(12) United States Patent
Matsushita

(10) Patent No.: US 9,134,175 B2
(45) Date of Patent: Sep. 15, 2015

(54) MEASUREMENT DEVICE

(71) Applicant: Seiko Epson Corporation, Tokyo (JP)

(72) Inventor: Tomonori Matsushita, Chino (JP)

(73) Assignee: Seiko Epson Corporation (JP)

( * ) Notice: Subject to any disclaimer, the term of this patent is extended or adjusted under 35 U.S.C. 154(b) by 19 days.

(21) Appl. No.: 14/187,437

(22) Filed: Feb. 24, 2014

(65) Prior Publication Data

US 2014/0240711 A1 Aug. 28, 2014

(30) Foreign Application Priority Data

Feb. 25, 2013 (JP) ................. 2013-034259

(51) Int. Cl.
*G01J 3/45* (2006.01)
*G01J 3/02* (2006.01)
*G02B 26/00* (2006.01)
*G01J 3/26* (2006.01)
*G01J 3/51* (2006.01)

(52) U.S. Cl.
CPC .............. *G01J 3/0205* (2013.01); *G01J 3/0264* (2013.01); *G01J 3/26* (2013.01); *G01J 3/51* (2013.01); *G02B 26/001* (2013.01)

(58) Field of Classification Search
CPC ......... G01J 3/0205; G01J 3/0264; G01J 3/26; G01J 3/51; G02B 26/001; G02B 5/284; G01B 9/0207; G01B 9/02072; G01B 9/02075; G01D 5/35312
USPC ........................................................ 356/454
See application file for complete search history.

(56) References Cited

U.S. PATENT DOCUMENTS

| | | | |
|---|---|---|---|
| 7,227,625 B2 | 6/2007 | Kobayashi et al. | |
| 2011/0292386 A1 | 12/2011 | Funamoto | |
| 2011/0313702 A1 | 12/2011 | Funamoto | |
| 2012/0147380 A1* | 6/2012 | Matsushita et al. | 356/456 |
| 2013/0311125 A1 | 11/2013 | Funamoto | |

FOREIGN PATENT DOCUMENTS

| | | |
|---|---|---|
| JP | 2002-071562 A | 3/2002 |
| JP | 2011-252749 A | 12/2011 |
| JP | 2012-007890 A | 1/2012 |
| WO | WO-03-073127 A1 | 9/2003 |

* cited by examiner

*Primary Examiner* — Tarifur Chowdhury
*Assistant Examiner* — Jonathon Cook
(74) *Attorney, Agent, or Firm* — Harness, Dickey & Pierce, P.L.C.

(57) ABSTRACT

A spectrometry device includes a wavelength-tunable interference filter that is provided with a stationary reflection film, a movable reflection film and an electrostatic actuator which changes a gap dimension between the stationary reflection film and the movable reflection film; a detector that receives incident light; a filter control unit that sets the gap dimension between the stationary reflection film and the movable reflection film to be a first dimension corresponding to light having a first wavelength which is smaller than that of a measurement target wavelength region; a cutoff filter that cuts off the light having a wavelength which is smaller than that of the measurement target wavelength region; and a light quantity acquisition unit that acquires the light quantity of stray light received by the detector when the gap dimension is changed to be the first dimension.

7 Claims, 16 Drawing Sheets

MEASUREMENT DEVICE

BACKGROUND

1. Technical Field

The present invention relates to a measurement device which measures a light quantity.

2. Related Art

In the related art, a measurement device has been known which measures a light receiving quantity by receiving light transmitted through an optical element (For example, refer to JP-A-2002-71562).

JP-A-2002-71562 discloses a device which causes light to be incident on a Fabry-Perot filter, receives measurement light transmitted through the Fabry-Perot filter using an infrared detector, and measures the light receiving quantity.

In JP-A-2002-71562, the measurement light transmitted through the Fabry-Perot filter (wavelength-tunable interference filter) is detected using a detector. However, in some cases, stray light which is not transmitted through the wavelength-tunable interference filter is received by the detector simultaneously with the measurement light. In this case, there is a problem in that the stray light causes noise components and consequently measurement accuracy is deteriorated.

SUMMARY

An advantage of some aspects of the invention is to provide a measurement device which can measure a light quantity with high measurement accuracy.

An aspect of the invention is directed to a measurement device including a cutoff filter that decreases light of a predetermined wavelength region in incident light; a first reflection film that partially reflects light transmitted through the cutoff filter and partially allows the light to be transmitted therethrough; a second reflection film that is opposed to the first reflection film, partially reflects the light transmitted through the first reflection film and partially allows the light to be transmitted therethrough; a gap change unit that changes a gap dimension between the first reflection film and the second reflection film; a light receiving unit that receives the light transmitted through the second reflection film; and a gap setting unit that controls the gap change unit and sets the gap dimension to be a first dimension corresponding to a first wavelength within the predetermined wavelength region.

In the aspect of the invention, the gap dimension between the first reflection film and the second reflection film is set to be the first dimension corresponding to the first wavelength within the wavelength region where a light quantity is decreased (cut off) by the cutoff filter. The light quantity of the light received by the light receiving unit at this time is acquired.

In this manner, an interference filter configured to have the first reflection film and the second reflection film enables the light having the first wavelength corresponding to the first dimension to be transmitted therethrough, but the light having the first wavelength is cut off by the cutoff filter. Therefore, the light transmitted through the interference filter cannot be incident on the light receiving unit, and the light which is not transmitted through the interference filter, that is, stray light, is received by the light receiving unit. Thus, it is possible to accurately detect the light quantity of the stray light. Accordingly, when measuring the light quantity of light of a predetermined wavelength region which is an actual measurement target, it is possible to measure the light quantity with high measurement accuracy by subtracting the light quantity of the stray light from a measurement value.

Another aspect of the invention is directed to a measurement device including a first reflection film that reflects a portion of incident light and allows a portion of the light to be transmitted therethrough; a second reflection film that is opposed to the first reflection film, reflects a portion of the light transmitted through the first reflection film and allows a portion of the light to be transmitted therethrough; a gap change unit that changes a gap dimension between the first reflection film and the second reflection film; a light receiving unit that receives the light transmitted through the second reflection film; and a gap setting unit that controls the gap change unit and sets the gap dimension to be a first dimension corresponding to a first wavelength within a predetermined wavelength region. The first wavelength is a wavelength in which light receiving sensitivity in the light receiving unit is equal to or less than a predetermined sensitivity threshold value.

In this aspect of the invention, similar to the above-described aspect of the invention, the gap dimension between the first reflection film and the second reflection film is set to be the first dimension corresponding to the first wavelength. The light quantity of the light received by the light receiving unit at this time is acquired.

At this time, the gap setting unit sets the first dimension to be a dimension corresponding to the first wavelength in which the light receiving sensitivity in the light receiving unit is equal to or less than the predetermined sensitivity threshold value. If the sensitivity threshold value is set to be a sufficiently smaller value than that of the light receiving sensitivity of a wavelength other than the first wavelength, even when the light transmitted through the interference filter reaches the light receiving unit, the detected light quantity is negligible as compared to the light quantity of the stray light. Therefore, in this aspect of the invention, it is possible to accurately detect the light quantity of the stray light, and to precisely measure the light quantity based on the detected light quantity of the stray light.

In the aspect of the invention, it is not necessary to dispose another filter such as the cutoff filter, thereby simplifying the configuration.

In the measurement device of the aspect of the invention, it is preferable that the measurement device includes a first substrate that has the first reflection film; a second substrate that has the second reflection film; and a gap dimension regulation unit that is disposed in at least any one of the first substrate and the second substrate and that comes into contact with the other substrate when the gap dimension is the first dimension.

Here, the aspect of the invention also includes a configuration where gap dimension regulation units are respectively disposed in both of the first substrate and the second substrate, and the gap dimension becomes the first dimension by the gap dimension regulation units being in contact with each other.

In this configuration, the gap dimension is set to be the first dimension by the gap dimension regulation unit coming into contact with the opposed substrate. In this configuration, it is possible to easily set the gap dimension between the reflection films to be the first dimension. In particular, as the gap change unit, a first electrode is disposed on the first substrate, a second electrode opposed to the first electrode is disposed on the second substrate, and a voltage is applied across the first electrode and the second electrode. In this manner, the first wavelength is effectively set to be a smaller wavelength than that of the predetermined wavelength region which is the measurement target by using an electrostatic actuator for changing the gap dimension. That is, when using the electrostatic actuator, electrostatic attraction is proportional to a dimension between the first electrode and the second electrode to a power of −2. Accordingly, the control becomes more difficult as the dimension between the electrodes is decreased. Thus, it is difficult to set the gap dimension to be very small. In contrast, when the gap dimension regulation unit is disposed as in the aspect of the invention, by applying a voltage which is equal to or higher than a drive voltage corresponding to the first wavelength to the electrostatic actuator, it is possible to easily set the gap dimension to be the first dimension.

In the measurement device of the aspect of the invention, it is preferable that the gap dimension regulation unit is disposed at a position where the first reflection film and the second reflection film are not overlapped with each other in a plan view where the first substrate and the second substrate are viewed from a thickness direction of the substrates.

In this configuration, the gap dimension regulation unit as described above is disposed at the position where the first reflection film and the second reflection film are not overlapped with each other in a plan view. Accordingly, without limiting an area of the first reflection film or the second reflection film, it is possible to suppress a decrease in the light quantity of the light transmitted through the interference filter.

In the measurement device of the aspect of the invention, it is preferable that the measurement device includes a light quantity acquisition unit that acquires a light quantity of light received by the light receiving unit when the gap dimension is set to be the first dimension; a measurement unit that acquires the light quantity of the light having a second wavelength which is received by the light receiving unit when the gap dimension is changed to be a gap dimension corresponding to the second wavelength outside the predetermined wavelength region; and a light quantity correction unit that acquires the light quantity as the light quantity of the light having the second wavelength by subtracting the light quantity acquired by the light quantity acquisition unit from the light quantity of the light having the second wavelength which is acquired by the measurement unit.

In this configuration, the measurement unit acquires a measurement value of the light quantity of the light having the second wavelength (for example, a target wavelength which is the measurement target), and the light quantity correction unit subtracts the light quantity of the above-described stray light from the measurement value. Accordingly, it is possible to acquire the exact light quantity of the light having the second wavelength which excludes the light quantity of the stray light from an actually measured value including the stray light.

In the measurement device of the aspect of the invention, it is preferable that each time measurement is performed by the measurement unit, the gap setting unit sets the gap dimension to be the first dimension, and causes the light quantity acquisition unit to acquire the light quantity of the light received by the light receiving unit.

In this configuration, each time the measurement is performed, the light quantity of the stray light is acquired. Therefore, it is possible to acquire an accurate measurement value even when the light quantity of the stray light is changed.

Here, in the aspect of the invention, the description of "each time the measurement is performed, the light quantity is acquired" has a manner of meaning as follows. For example, when the second wavelength is sequentially switched in the predetermined wavelength region which is the measurement target and the light quantity of the light having each of the second wavelengths is sequentially measured, the light quantity (stray light quantity) may be measured by setting the light quantity measurement for all of the second wavelengths to be a single measurement processing operation, each time the measurement processing operation is performed. Alternatively, the light quantity (stray light quantity) may be measured, each time the light quantity is measured for each of the second wavelengths. The former case enables quick measurement of the light quantity and the latter case enables the measurement value to be more accurately corrected by using the light quantity of the stray light. Therefore, it is possible to exactly measure the light quantity.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

First Embodiment

Hereinafter, a first embodiment of the invention will be described with reference to the drawings.

Figure 1:
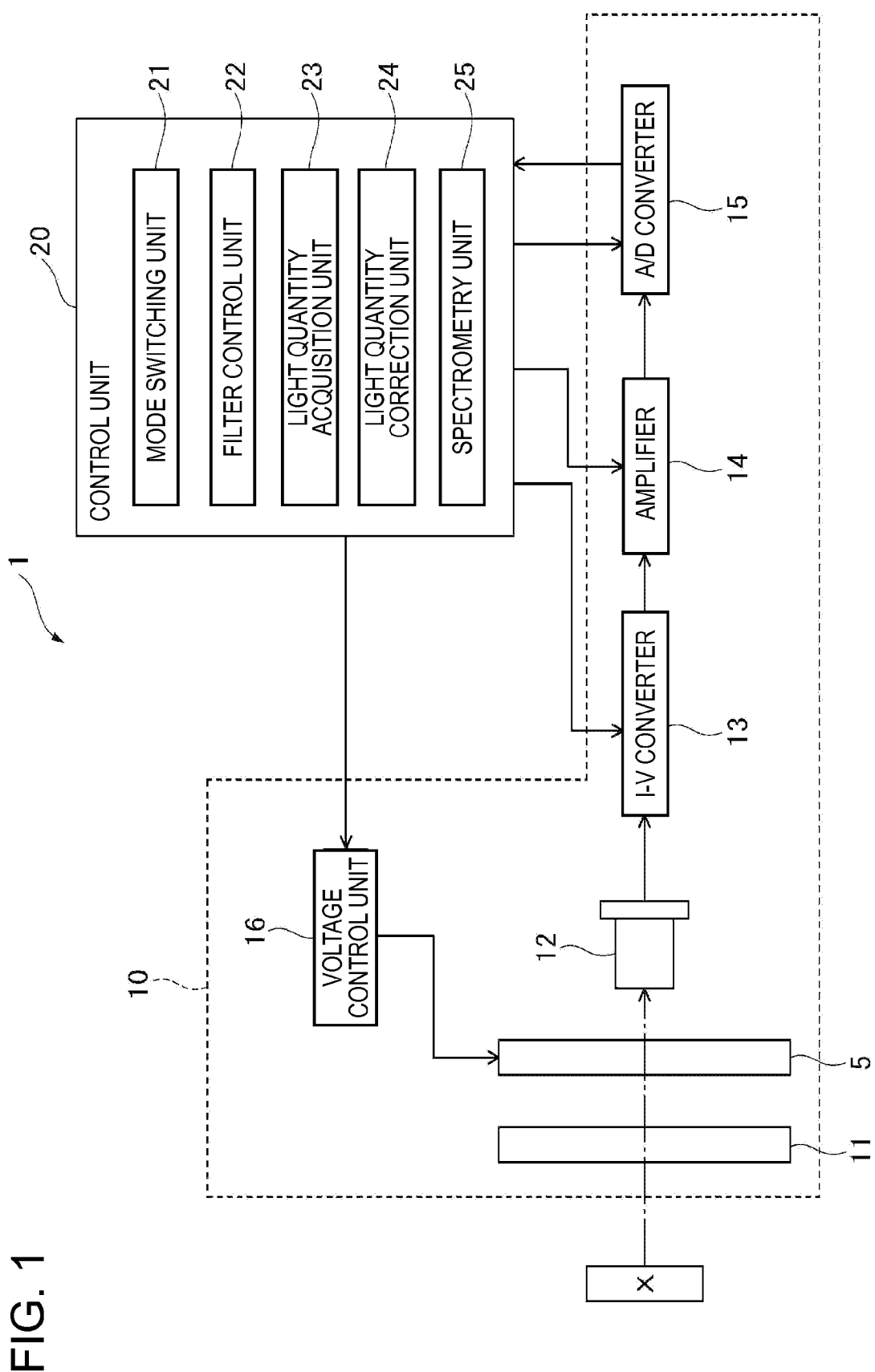
FIG. 1 is a block diagram illustrating a schematic configuration of a spectrometry device of a first embodiment according to the invention.

FIG. 1 is a block diagram illustrating a schematic configuration of a spectrometry device (measurement device) of the first embodiment.

Configuration of Spectrometry Device

FIG. 1 is the block diagram illustrating the schematic configuration of the spectrometry device of the first embodiment according to the invention.

A spectrometry device 1 is an example of the measurement device according to the invention, and is a device which analyzes light intensity of each wavelength in incident light (measurement target light) from a measurement target X and measures an optical spectrum. In the present embodiment, an example of measuring measurement target light reflected on the measurement target X will be described. However, when using a light emitter such as a liquid crystal panel, for example, as the measurement target X, light emitted from the light emitter may be the measurement target light.

Then, as illustrated in FIG. 1, the spectrometry device 1 includes an optical module 10 and a control unit 20 which controls the optical module 10 and processes a signal output from the optical module 10.

Configuration of Optical Module

The optical module 10 includes a wavelength-tunable interference filter 5, a cutoff filter 11, a detector 12 (light receiving unit), an I-V converter 13, an amplifier 14, an A/D converter 15 and a voltage control unit 16.

The optical module 10 introduces the measurement target light reflected on the measurement target X to the cutoff filter 11 and the wavelength-tunable interference filter 5 through an incident light optical system (not illustrated), and the light transmitted through the wavelength-tunable interference filter 5 is received by the detector 12. Then, a detection signal output from the detector 12 is output to the control unit 20 via the I-V converter 13, the amplifier 14 and the A/D converter 15. In the embodiment, the cutoff filter 11 is disposed in front of the wavelength-tunable interference filter 5 as an example. However, without being limited thereto, for example, the cutoff filter 11 may be bonded to a surface of the detector 12, may be disposed between the wavelength-tunable interference filter 5 and the detector 12, or may be disposed inside the incident light optical system.

Configuration of Wavelength-Tunable Interference Filter

Next, the wavelength-tunable interference filter 5 to be incorporated into the optical module 10 will be described.

Figure 2:
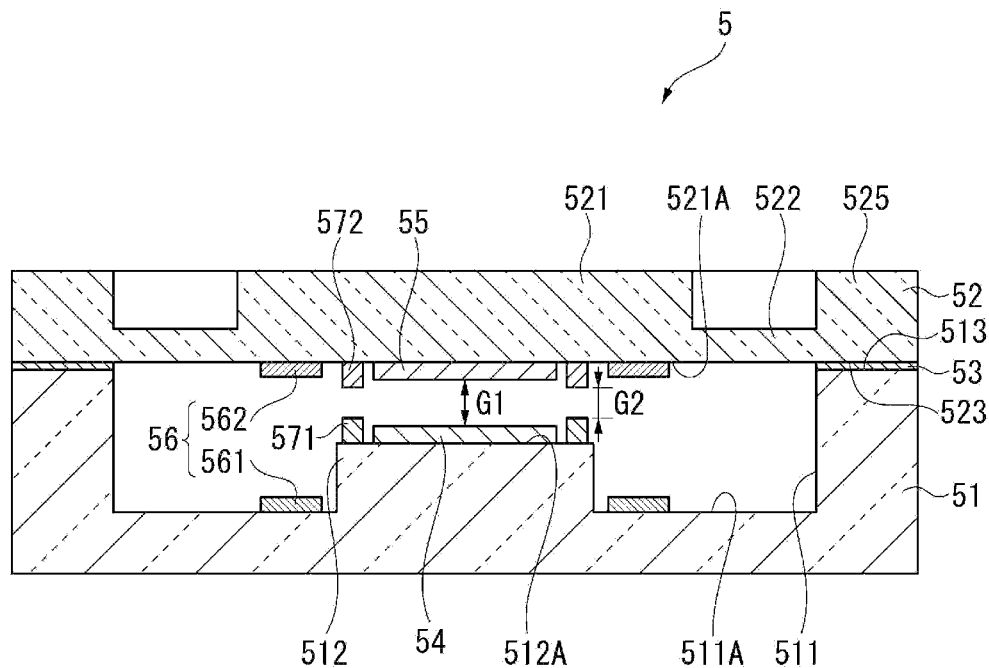
FIG. 2 is a cross-sectional view illustrating a schematic configuration of a wavelength-tunable interference filter of the first embodiment.

FIG. 2 is a cross-sectional view illustrating a schematic configuration of the wavelength-tunable interference filter 5.

As illustrated in FIG. 2, the wavelength-tunable interference filter 5 includes a stationary substrate 51 configuring a first substrate and a movable substrate 52 configuring a second substrate. The stationary substrate 51 and the movable substrate 52 are respectively formed of various types of glass such as soda glass, crystalline glass, quartz glass, lead glass, potassium glass, borosilicate glass, alkali-free glass and the like, or quartz crystal, for example. Then, a first joining portion 513 of the stationary substrate 51 and a second joining portion 523 of the movable substrate 52 are joined and integrated with each other by a joining film 53 configured to have a plasma polymerized film mainly composed of siloxane, for example.

A surface of the stationary substrate 51 opposed to the movable substrate 52 has a stationary reflection film 54 configuring a first reflection film. A surface of the movable substrate 52 opposed to the stationary substrate 51 has a movable reflection film 55 configuring a second reflection film. The stationary reflection film 54 and the movable reflection film 55 are arranged to be opposed to each other via a gap G1. Then, an optical interference region is configured to include a region where the stationary reflection film 54 and the movable reflection film 55 are overlapped with each other in a plan view when the stationary substrate 51 and the movable substrate 52 are viewed in the thickness direction.

The wavelength-tunable interference filter 5 has an electrostatic actuator 56 that is an example of a gap change unit according to the invention which is used when adjusting (changing) a gap dimension of the gap G1 between the reflection films 54 and 55. The electrostatic actuator 56 applies a predetermined voltage across the opposed electrodes. In this manner, it is possible to easily change the dimension of the gap G1 by using electrostatic attraction, thereby simplifying the configuration. The electrostatic actuator 56 can be driven by a control of the voltage control unit 16.

In the following description, a plan view when the stationary substrate 51 or the movable substrate 52 is viewed in the thickness direction of the substrate, that is, a plan view when the wavelength-tunable interference filter 5 is viewed from a stacking direction of the stationary substrate 51 and the movable substrate 52 is referred to as a filter plan view. In the embodiment, in the filter plan view, a center point of the stationary reflection film 54 and a center point of the movable reflection film 55 are coincident with each other. The center point of these reflection films in a plan view is referred to as a filter center point and a straight line passing through the center point of these reflection films is referred to as a center axis.

Configuration of Stationary Substrate

The stationary substrate 51 is formed to have a thickness dimension which is thicker than that of the movable substrate 52. The stationary substrate 51 has no electrostatic attraction generated by the electrostatic actuator 56, or no deflection caused by an internal stress of a film member (for example, the stationary reflection film 54 or the like) formed on the stationary substrate 51.

As illustrated in FIG. 2, the stationary substrate includes an electrode arrangement groove 511 and a reflection film installation portion 512 which are formed by etching or the like.

The electrode arrangement groove 511 is formed in an annular shape about the filter center point of the stationary substrate 51 in the filter plan view. The reflection film installation portion 512 is formed to protrude from a center portion of the electrode arrangement groove 511 to the movable substrate 52 side in the filter plan view. A groove bottom surface of the electrode arrangement groove 511 serves as an electrode installation surface 511A on which a first drive electrode 561 configuring the electrostatic actuator 56 is arranged. In addition, a protruding tip surface of the reflection film installation portion 512 serves as a reflection film installation surface 512A on which the stationary reflection film 54 is arranged.

In addition, the stationary substrate 51 has two electrode extracting grooves (not illustrated) which extend toward an outer peripheral edge of the stationary substrate 51 from the electrode arrangement groove 511.

The first drive electrode 561 may be directly disposed on the electrode installation surface 511A, or may be installed thereon by disposing another thin film (layer) on the electrode installation surface 511A. For example, the first drive electrode 561 is formed in an annular shape about the filter center point. In the embodiment, an annular electrode configuration has been described as an example, but the configuration may include a C-shaped electrode where an annular portion is notched. In addition, the configuration may be made so that two or more first drive electrodes 561 are concentrically arranged to form a double electrode structure.

Then, a first extracting electrode (not illustrated) is connected to a portion of the outer peripheral edge of the first drive electrode 561. The first extracting electrode is extracted to the outer peripheral edge of the stationary substrate 51 along one electrode extracting groove disposed in the stationary substrate 51, and is connected to the voltage control unit 16 in the tip portion thereof.

The first drive electrode 561 and the first extracting electrode include indium tin oxide (ITO), for example.

In addition, an insulating film may be formed on a surface of the first drive electrode 561.

As described above, the reflection film installation portion 512 is formed coaxially with the electrode arrangement groove 511 to have a substantially cylindrical shape having a smaller diameter dimension than that of the electrode arrangement groove 511, and includes the reflection film installation surface 512A opposed to the movable substrate 52.

The reflection film installation portion 512 has the stationary reflection film 54 and a first pillar 571 configuring one of the gap dimension regulation units.

The stationary reflection film 54 may be directly disposed in the reflection film installation portion 512, or may be installed thereon by disposing another thin transparent film (layer) on the reflection film installation portion 512. For example, the stationary reflection film 54 can be formed by using a metal film made of Ag or a conductive alloy film made of Ag alloy. When using the metal film made of Ag, it is preferable to form a protective film to suppress deterioration of the Ag.

In addition, for example, a dielectric multilayer film may be used in which by forming a high refractive index layer using $TiO_2$ and a low refractive index layer using $SiO_2$, the high refractive index layer and the low refractive index layer are alternately stacked one on another. A reflection film in which the dielectric multilayer film and the metal film are stacked one on another, or a reflection film in which the dielectric multilayer film and the alloy film are stacked one on another may be used.

The first pillar 571 is disposed outside the stationary reflection film 54 in the filter plan view. For example, the first pillars 571 may be disposed in an annular shape about the filter center point, or may be arranged at regular intervals on a circumference of a virtual circle about the filter center point.

Then, the first pillar 571 is formed so that a height dimension thereof from the reflection film installation surface 512A is higher than a film thickness dimension of the stationary reflection film 54 by 25 nm, for example.

A forming material of the first pillar 571 is not particularly limited, but may be configured to have $SiO_2$, for example. The first pillar 571 and the stationary substrate 51 may be formed integrally with each other. In this case, the electrode arrangement groove 511, the reflection film installation portion 512 and the first pillar 571 are formed by performing a three-stage etching process on the stationary substrate 51.

Furthermore, a light incident surface of the stationary substrate 51 (surface having no stationary reflection film 54) may have an anti-reflection film at a position corresponding to the stationary reflection film 54. The anti-reflection film decreases reflectance of visible light on the surface of the stationary substrate 51, thereby increasing transmittance.

Configuration of Movable Substrate

As illustrated in FIG. 2, the movable substrate 52 includes a movable portion 521 which is circular about the filter center point in the filter plan view, a holding portion 522 which is coaxial with the movable portion 521 and holds the movable portion 521, and a second joining portion 523 disposed outside the holding portion 522.

The movable portion 521 is formed so that the thickness dimension is thicker than that of the holding portion 522. For example, in the embodiment, the movable portion 521 is formed to have the same dimension as the thickness dimension of the movable substrate 52 (second joining portion 523). The movable portion 521 is formed to have a larger diameter dimension than at least the diameter dimension of the outer peripheral edge of the reflection film installation surface 512A in the filter plan view. Then, the movable portion 521 has a second drive electrode 562 configuring the electrostatic actuator 56, a movable reflection film 55 and a second pillar 572. The second drive electrode 562 and the movable reflection film 55 may be directly disposed on a movable surface 521A, or may be arranged thereon by disposing another thin film (layer) on the movable surface 521A.

Similar to the stationary substrate 51, the anti-reflection film may be formed on the opposite side surface to the stationary substrate 51 of the movable portion 521.

The second drive electrode 562 is formed in an annular shape about the filter center point, and opposed to the first drive electrode 561. In addition, a second extracting electrode is connected to the second drive electrode 562. The second extracting electrode is opposed to an electrode extracting groove in which the first extracting electrode is not arranged, and is extracted to the outer peripheral edge of the movable substrate 52. Then, a tip portion of the second extracting electrode is connected to the voltage control unit 16 via an FPC or a lead wire, for example.

In addition, the second drive electrode 562 may have an insulating film on a surface thereof.

The movable reflection film 55 is disposed to be opposed to the stationary reflection film 54 via the gap G1, in the center portion of the movable surface 521A of the movable portion 521. As the movable reflection film 55, a reflection film is used which has the same configuration as that of the above-described stationary reflection film 54.

The second pillar 572 configures one of the gap dimension regulation units. The second pillar 572 is disposed in the filter center point side from the second drive electrode 562, outside the movable reflection film 55 in the filter plan view, and is opposed to the first pillar 571.

Similar to the first pillar 571, the second pillars 572 may be formed in an annular shape in the filter plan view, or may be arranged at regular intervals on a circumference of a virtual circle about the filter center point.

Then, the second pillar 572 is formed so that the height dimension from the movable surface 521A where the movable portion 521 is opposed to the stationary substrate 51 is higher than the film thickness dimension of the movable reflection film 55 by 25 nm, for example. That is, the dimension of a gap G2 between the first pillar 571 and the second pillar 572 is smaller than the dimension of the gap G1 between the reflection films 54 and 55.

A forming material of the second pillar 572 is not particularly limited, but similar to the first pillar 571, may be configured to have $SiO_2$ or the like. In addition, the second pillar 572 and the movable substrate 52 may be formed integrally with each other.

The holding portion 522 is a diaphragm surrounding the movable portion 521, and is formed to have the thickness dimension which is thinner than that of the movable portion 521. The holding portion 522 is more likely to be bent than the movable portion 521. Thus, it is possible to displace the movable portion 521 to the stationary substrate 51 side by using slight electrostatic attraction. At this time, the movable portion 521 has the thicker thickness dimension and the stronger rigidity than those of the holding portion 522. Accordingly, even when the movable portion 521 is pulled to the stationary substrate 51 side by the electrostatic attraction, a change in the shape of the movable portion 521 can be suppressed to some extent.

In the embodiment, the holding portion 522 having a diaphragm shape has been described as an example, but is not limited thereto. For example, the configuration may be made so that beam-shaped holding portions are arranged at equal angular intervals about the filter center point of the movable portion 521.

Configuration of Cutoff Filter

Referring back to FIG. 1, the cutoff filter 11 of the optical module 10 will be described.

The cutoff filter 11 allows the light having the measurement target wavelength (for example, in the embodiment, the light of a visible light region from 380 nm to 700 nm) within the light incident on the optical module 10 to be transmitted therethrough, and blocks the light of another wavelength region, that is, decreases the light quantity. Here, the wavelength region other than the measurement target wavelength is a predetermined wavelength region described in the embodiment.

The wavelength region blocked by the cutoff filter 11 may be a smaller wavelength region with respect to at least the measurement target wavelength region. For example, in the embodiment, the light of a near-infrared or larger wavelength region may be transmitted therethrough.

Configuration of Detector

The detector 12 receives (detects) the light transmitted through the wavelength-tunable interference filter 5, and outputs a detection signal based on a light receiving quantity to the I-V converter 13.

Figure 3:
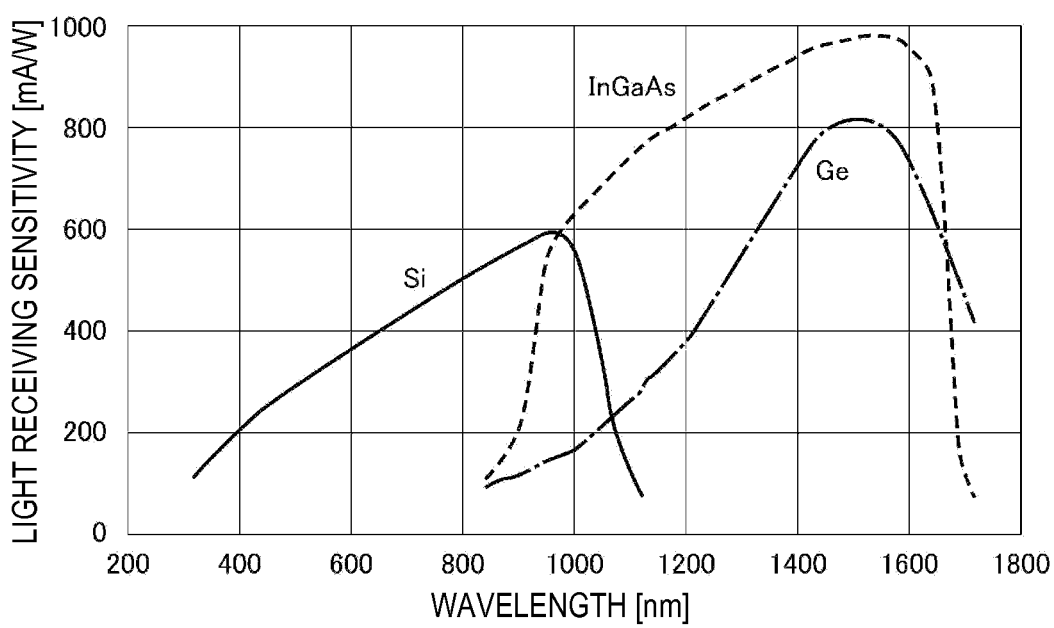
FIG. 3 illustrates an example of light receiving sensitivity of a detector.

FIG. 3 illustrates an example of sensitivity characteristics of various detectors.

In the embodiment, the measurement target wavelength region is set to be a visible light region. Si photodiodes which have high light receiving sensitivity with respect to the visible light region are used in the detector 12. Since the cutoff filter 11 is disposed, the light having the wavelength shorter than 380 nm is cut off.

Other Configuration of Optical Module

The I-V converter 13 converts the detection signal input from the detector 12 into a voltage value, and outputs the voltage value to the amplifier 14.

The amplifier 14 amplifies the voltage (detection voltage) according to the detection signal input from the I-V converter 13.

The A/D converter 15 converts the detection voltage (analog signal) input from the amplifier 14 into a digital signal, and outputs the digital signal to the control unit 20.

Based on the control of the control unit 20, the voltage control unit 16 applies a drive voltage to the electrostatic actuator 56 of the wavelength-tunable interference filter 5. This generates the electrostatic attraction between the first drive electrode 561 and the second drive electrode 562 of the electrostatic actuator 56, and thus the movable portion 521 is displaced to the stationary substrate 51 side.

Configuration of Control Unit

Next, the control unit 20 of the spectrometry device 1 will be described.

The control unit 20 is configured to have a combination of a CPU and a memory, for example, and controls entire operations of the spectrometry device 1. As illustrated in FIG. 1, the control unit 20 includes a mode switching unit 21, a filter control unit 22, a light quantity acquisition unit 23, a light quantity correction unit 24 and a spectrometry unit 25. The memory of the control unit 20 stores the wavelength of the light transmitted through the wavelength-tunable interference filter 5, and V–λ data illustrating a relationship with the drive voltage applied to the electrostatic actuator 56 corresponding to the wavelength.

The mode switching unit 21 switches between a measurement mode for performing spectrometry using the optical module 10 and a stray light inspection mode for detecting the light quantity of the stray light within the light incident on the optical module 10.

The filter control unit 22, in the measurement mode, reads out the drive voltage corresponding to a predetermined target wavelength (the second wavelength in the embodiment) in the measurement target wavelengths (for example, the visible light region in the embodiment) from the V–λ data, and outputs a command signal indicating that the read-out drive voltage is to be applied to the electrostatic actuator 56, to the voltage control unit 16.

In addition, the filter control unit 22, in the stray light inspection mode, outputs the command signal indicating that the maximum drive voltage is to be applied to the electrostatic actuator 56, for example. That is, the filter control unit 22 functions as the gap setting unit.

Here, in the wavelength-tunable interference filter 5, the maximum drive voltage represents the drive voltage or higher which corresponds to the first dimension (for example, 50 nm in the embodiment), that is, the gap dimension between the reflection films 54 and 55 when the first pillar 571 and the second pillar 572 come into contact with each other. For example, if a drive voltage $V_{50}$ (V) when the gap dimension is set to be 50 nm is recorded as the V–λ data, the filter control unit 22, in the stray light inspection mode, outputs the command signal indicating that the drive voltage of $V_{50}$ (V) or higher is to be applied.

The light quantity acquisition unit 23 acquires the light quantity of the light received by the detector 12. That is, the light quantity acquisition unit 23, in the measurement mode, acquires the light quantity (measurement value) of the light transmitted through the wavelength-tunable interference filter 5, and in the stray light inspection mode, acquires the light quantity of the stray light received by the detector 12 without being transmitted through the wavelength-tunable interference filter 5. Accordingly, the light quantity acquisition unit 23 also functions as the measurement unit.

The light quantity correction unit 24 corrects the light quantity of the light having the target wavelength which is acquired in the measurement mode, by using the light quantity of the stray light which is acquired in the stray light inspection mode, and calculates the exact light quantity of the light having the target wavelength.

The spectrometry unit 25 measures spectral characteristics of the measurement target light based on the light quantity calculated by the light quantity correction unit 24.

Measurement Process in Spectrometry Device

Next, a spectrometry process using the spectrometry device 1 of the embodiment will be described with reference to the drawings.

Figure 4:
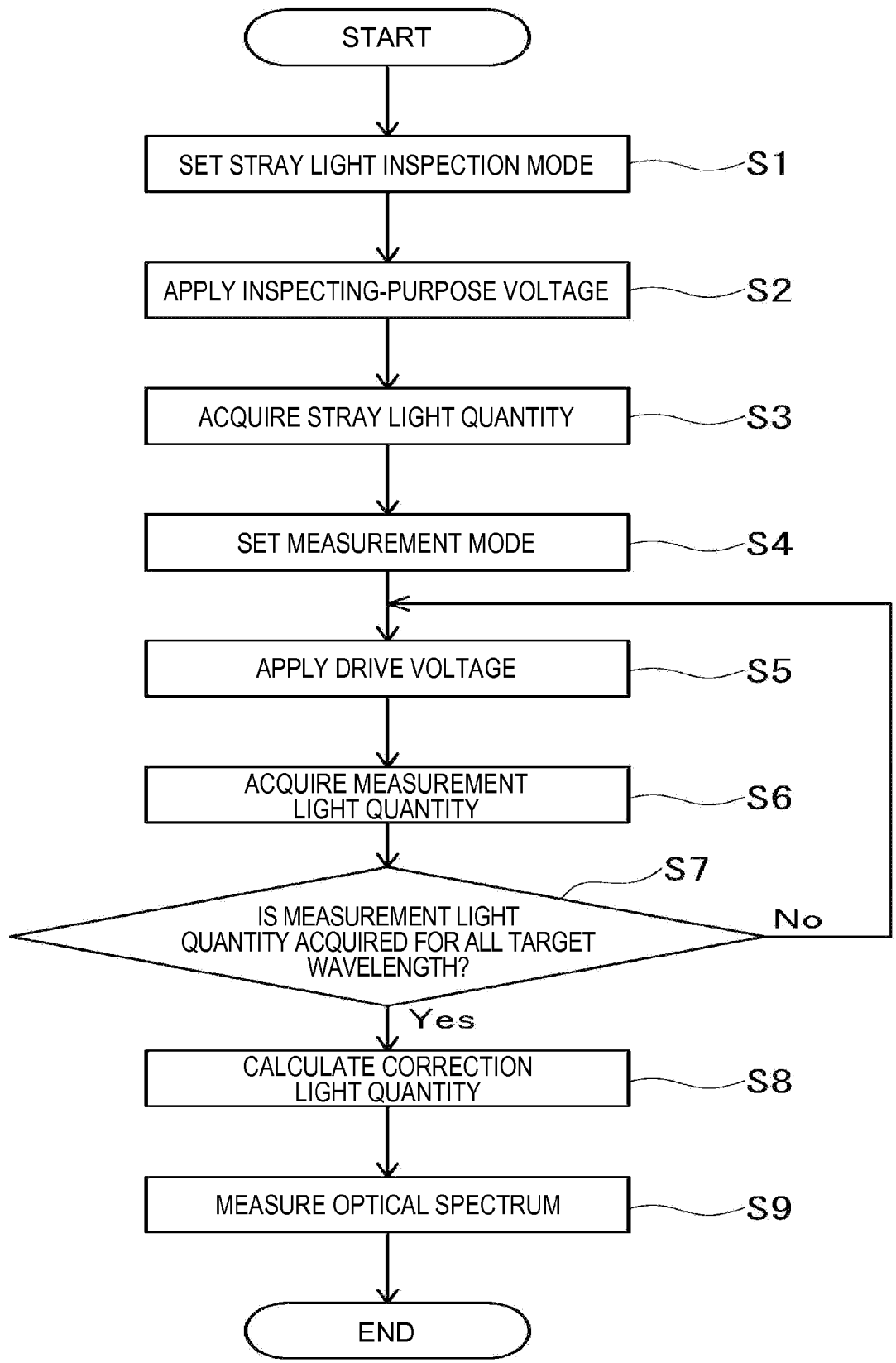
FIG. 4 is a flowchart illustrating a spectrometry method of the spectrometry device of the first embodiment.

FIG. 4 is a flowchart of the spectrometry process of the embodiment.

For example, if the spectrometry process is started by an operation of a measuring person, the mode switching unit 21 of the control unit 20 first sets an operation mode to be the stray light inspection mode (step S1).

In the stray light inspection mode, the filter control unit 22 applies an inspection-purpose voltage (for example, the maximum voltage) that is the drive voltage or higher which corresponds to the first dimension (in the embodiment, 50 nm), to the electrostatic actuator 56 of the wavelength-tunable interference filter 5 (step S2).

Figure 5:
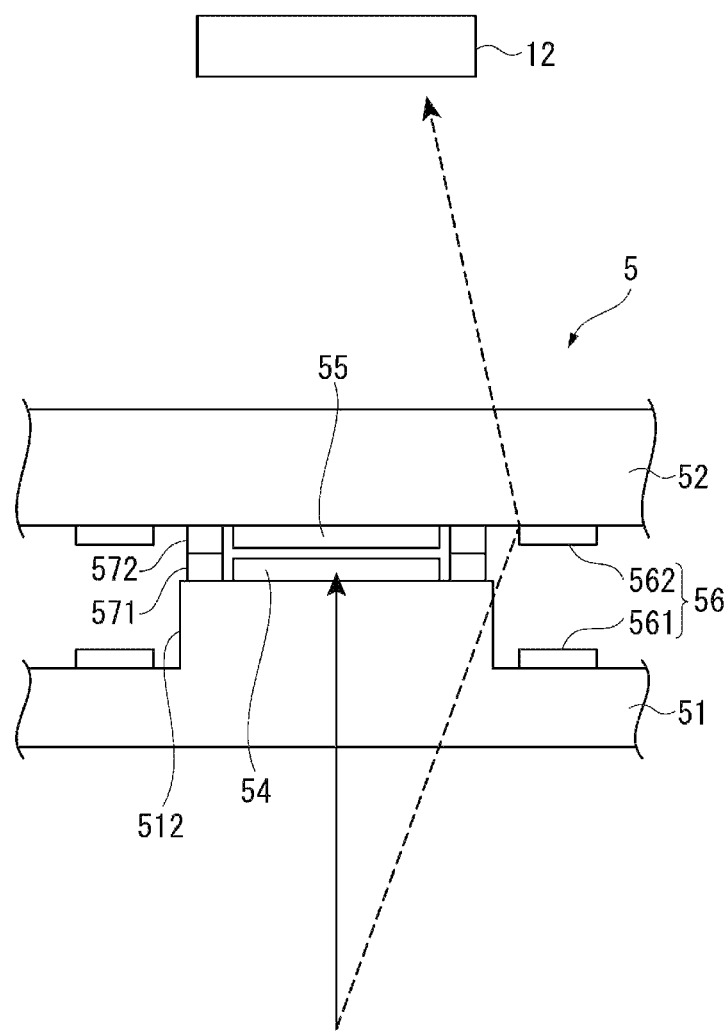
FIG. 5 illustrates a state of the wavelength-tunable interference filter in a stray light inspection mode, and light incident on the detector in the first embodiment.

FIG. 5 illustrates a state of the wavelength-tunable interference filter 5 in the stray light inspection mode and the light incident on the detector 12. A dashed line in FIG. 5 represents the stray light, and a solid line represents the light incident on the wavelength-tunable interference filter 5.

As illustrated in FIG. 5, if the inspection-purpose voltage is applied to the electrostatic actuator 56 as in step S2, the first pillar 571 and the second pillar 572 come into contact with each other, thereby causing the gap G1 between the reflection films 54 and 55 to be 50 nm which is the first dimension.

Figure 6:
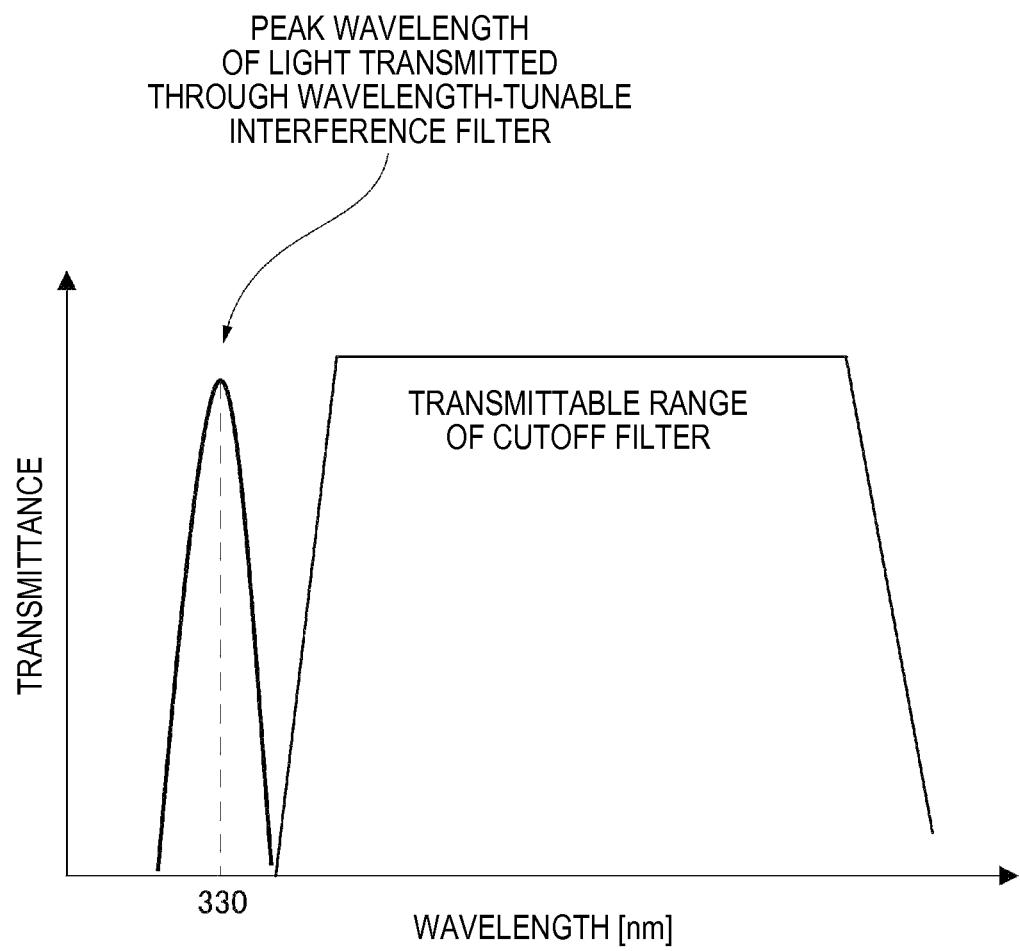
FIG. 6 illustrates a peak wavelength of light transmitted through the wavelength-tunable interference filter in the stray light inspection mode, and a transmission wavelength region of light in a cutoff filter in the first embodiment.

In addition, FIG. 6 illustrates a peak wavelength of the light transmitted through the wavelength-tunable interference filter 5 in the stray light inspection mode, and a transmission wavelength region of the light in the cutoff filter 11 in step S2.

If the gap G1 between the reflection films 54 and 55 is set to be the first dimension (50 nm) in step S2, the light having the peak wavelength of 330 nm can be transmitted through the wavelength-tunable interference filter 5. In contrast, in the embodiment, since the Si photodiodes are used as the detector 12, it is possible to detect even the light having the wavelength of approximately 190 nm.

However, in the embodiment, as illustrated in FIG. 6, since the cutoff filter 11 is disposed, the light having the wavelength of approximately 330 nm which can be transmitted through the wavelength-tunable interference filter 5 is cut off by the cutoff filter 11 and does not reach the detector 12.

In this manner, as illustrated in FIG. 5, the stray light which is not transmitted through the wavelength-tunable interference filter 5 reaches the detector 12.

After step S2, the light quantity acquisition unit 23 of the control unit 20 acquires the light quantity of the light received by the detector 12 as the stray light quantity, and stores the stray light quantity in a storage unit such as the memory or the like, for example (step S3).

Thereafter, the mode switching unit 21 of the control unit 20 sets the operation mode to be the measurement mode (step S4).

In the measurement mode, the filter control unit 22 reads out the drive voltage for a predetermined target wavelength of the measurement target wavelength region from the V–λ data stored in the memory, and outputs the command signal indicating that the drive voltage is to be applied to the electrostatic actuator 56, to the voltage control unit 16. This allows the drive voltage to be applied to the electrostatic actuator 56, thereby setting the gap G1 to be the dimension corresponding to the target wavelength (step S5).

Figure 7:
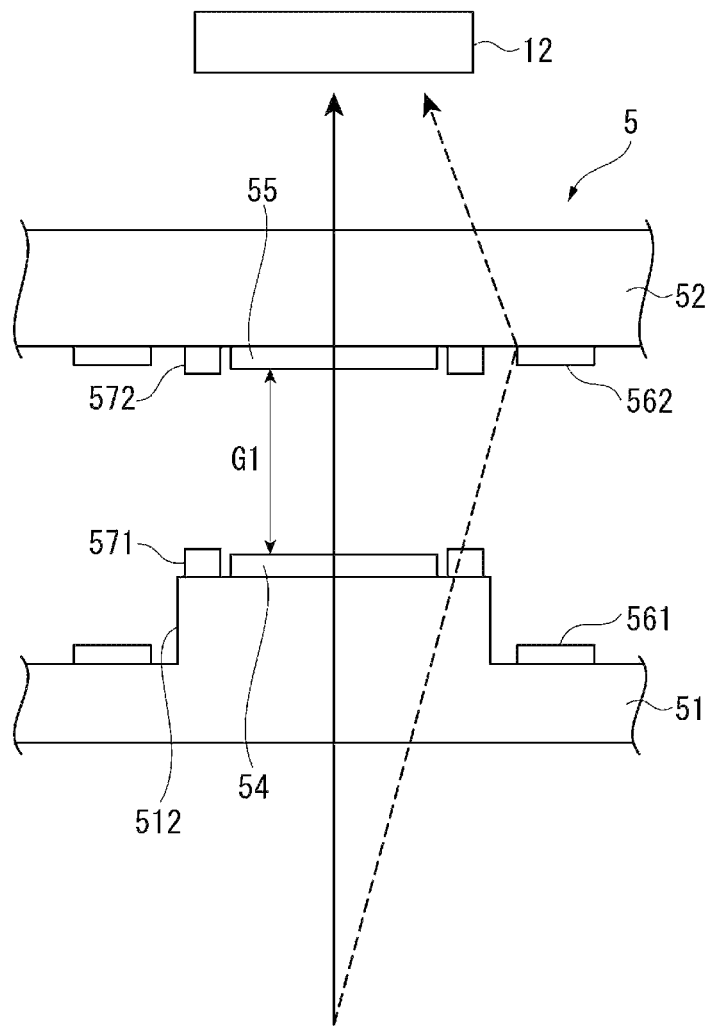
FIG. 7 illustrates a state of the wavelength-tunable interference filter in a measurement mode, and light incident on the detector in the first embodiment.

FIG. 7 illustrates a state of the wavelength-tunable interference filter 5 in the measurement mode, and the light incident on the detector 12.

If the drive voltage is applied to the electrostatic actuator 56 by the voltage control unit 16 in step S5, the light having the target wavelength is transmitted through the wavelength-tunable interference filter 5, and is received by the detector 12.

After step S5, the light quantity acquisition unit 23 of the control unit 20 acquires the light quantity of the light received by the detector 12 as the measurement light quantity, and stores the measurement light quantity in the storage unit such as the memory or the like, for example (step S6).

Thereafter, in the measurement target wavelength region, the control unit 20 determines whether or not the measurement light quantity of all the light having the target wavelength is acquired (step S7).

In step S7, when there is a measurement light quantity having the target wavelength which is not acquired (when it is determined "No"), the process returns to step S5, and the light quantity measurement in the measurement mode is continued by changing the target wavelength. For example, the target wavelength may be a wavelength which is set by a measuring person in advance, or may be a wavelength having a predetermined wavelength interval (for example, an interval of 10 nm).

In step S7, when it is determined that all the measurement light quantity having the target wavelength is acquired, the light quantity correction unit 24 calculates a correction light quantity by subtracting the stray light quantity acquired in step S3 from the measurement light quantity acquired in step S6 (step S8).

Figure 8:
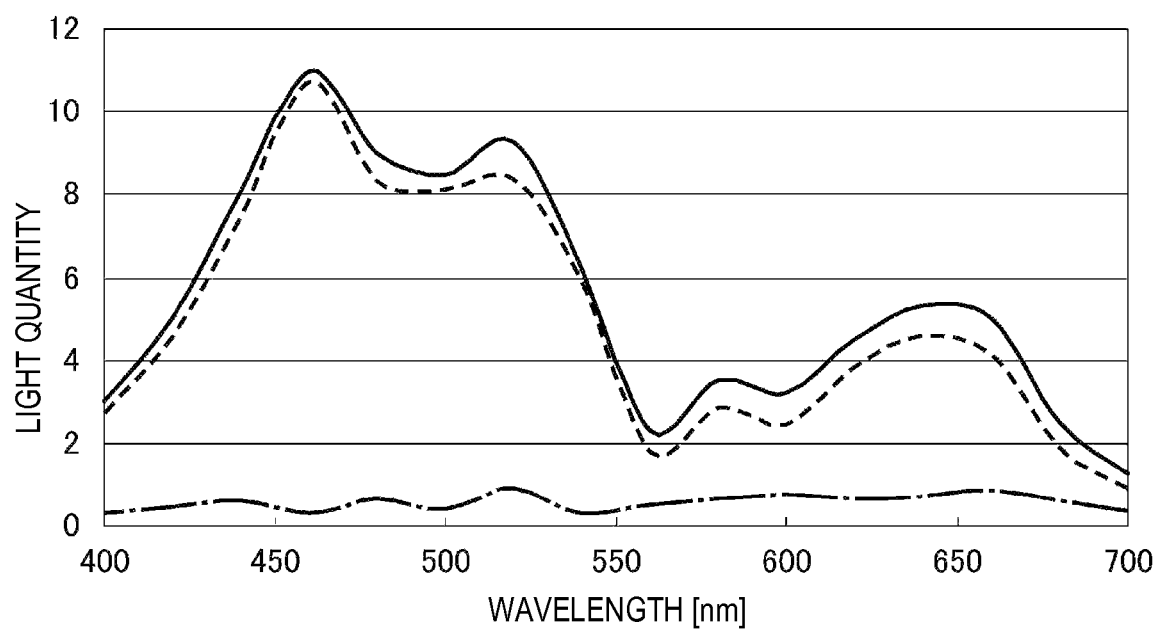
FIG. 8 illustrates an example of a measurement light quantity and a stray light quantity which are detected by the detector, and a calculated correction light quantity in the first embodiment.

FIG. 8 illustrates an example of the measurement light quantity (solid line) output from the detector 12, the stray light quantity (one-dot chain line) and the calculated correction light quantity (dashed line).

As illustrated in FIG. 7, in the measurement mode, in addition to the light transmitted through the wavelength-tunable interference filter 5, the stray light which is not transmitted through the wavelength-tunable interference filter 5 is also received by the detector 12. Accordingly, as illustrated in FIG. 8, the measurement light quantity is larger than the actual light quantity of the light having the target wavelength.

In contrast, in step S8, it is possible to acquire the correction light quantity as illustrated by the dashed line in FIG. 8 by subtracting the stray light quantity from the measurement light quantity. That is, it is possible to exactly acquire the light quantity for each wavelength. The calculated correction light quantity is stored in the storage unit such as the memory or the like.

Thereafter, the spectrometry unit 25 measures the optical spectrum as illustrated by the dashed line in FIG. 8, based on the calculated correction light quantity (step S9).

Advantageous Effects of First Embodiment

In the embodiment, the cutoff filter 11 is arranged in front of the wavelength-tunable interference filter 5. In this manner, the light of the smaller wavelength region with respect to the measurement target wavelength region is cut off, and in addition, in the stray light inspection mode, the dimension of the gap G1 between the reflection films 54 and 55 in the wavelength-tunable interference filter 5 is set to be the first dimension which is smaller than the dimension corresponding to the measurement target wavelength region, that is, the first dimension corresponding to a predetermined dimension within the wavelength region which is cut off by the cutoff filter 11. Therefore, in the stray light inspection mode, the light transmitted through the wavelength-tunable interference filter 5 does not reach the detector 12, and the stray light which is not transmitted through the wavelength-tunable interference filter 5 is received by the detector 12. Accordingly, it is possible to accurately detect the stray light quantity.

By measuring the stray light quantity, it is possible to accurately detect the actual light quantity having the target wavelength which is obtained by subtracting the stray light quantity from the measurement light quantity using the light quantity correction unit 24 in the measurement mode.

Accordingly, it is possible to obtain the exact optical spectrum for the measurement target X which excludes stray light components.

In the embodiment, the first pillar 571 is disposed in the stationary substrate 51 of the wavelength-tunable interference filter 5, and the second pillar 572 opposed to the first pillar 571 is disposed in the movable substrate 52. Each height dimension (thickness dimension) of the first pillar 571 and the second pillar 572 is set so that the dimension of the gap G1 is the first dimension when the first pillar 571 and the second pillar 572 come into contact with each other.

In this configuration, if in the stray light inspection mode, the drive voltage or higher which corresponds to the stray light inspection dimension is set to be the stray light inspection-purpose voltage to be applied to the electrostatic actuator 56, it is possible to easily set the dimension of the gap G1 to be the first dimension of the stray light.

In the embodiment, the electrostatic actuator 56 is used as the gap change unit. It is possible to achieve the electrostatic actuator 56 by using a simple configuration where the drive electrodes 561 and 562 are merely arranged to be opposed to each other. However, the gap control becomes more difficult as the gap between the drive electrodes 561 and 562 is decreased. In contrast, in the embodiment, the first pillar 571 and the second pillar 572 are disposed as described above. Accordingly, even when the electrostatic actuator 56 is used, it is possible to easily adjust a gap amount of the gap G1 to be the first dimension for the first wavelength which is smaller than that of the measurement target wavelength region. Furthermore, even when the voltage applied to the electrostatic actuator 56 is temporarily increased due to incorporation of noise or the like, since the first pillar 571 and the second pillar 572 come into contact with each other, the gap dimension is not further decreased and thus, it is possible to prevent the reflection films 54 and 55 from coming into contact with each other.

In the embodiment, the first pillar 571 and the second pillar 572 are respectively disposed outside the stationary reflection film 54 and the movable reflection film 55 in the filter plan view. Therefore, the area of the reflection films 54 and 55 is not limited by the first pillar 571 and the second pillar 572, and the light quantity of the light transmitted through the wavelength-tunable interference filter 5 is not decreased. Accordingly, it is possible to accurately perform the spectrometry process without a decrease in the light quantity.

In the embodiment, before the measurement light quantity is acquired for a plurality of target wavelengths in the measurement mode, the stray light quantity is acquired through the stray light inspection mode. Therefore, it is possible to easily acquire the exact light quantity (correction light quantity) for each wavelength by subtracting the stray light quantity acquired in the stray light inspection mode from the measurement light quantity after acquiring the measurement light quantity for each wavelength. In addition, when performing the subsequent measurement, the stray light inspection mode is repeated. Accordingly, even when the stray light quantity varies per each measurement, it is possible to properly correct the measurement light quantity by using the stray light acquired in the stray light inspection mode.

Second Embodiment

Next, a second embodiment of the invention will be described with reference to the drawings.

In the above-described embodiment, an example has been described where the measurement target wavelength is set to be the visible light region, the cutoff filter 11 which cuts off the light of the smaller wavelength region with respect to the visible light region is disposed, and when the dimension of the gap G1 between the reflection films 54 and 55 is set to be the first dimension, the light which can be transmitted through the wavelength-tunable interference filter 5 (light having the peak wavelength of 330 nm, in an example of the first embodiment) is blocked by the cutoff filter 11.

In contrast, the second embodiment is different from the above-described first embodiment in that the cutoff filter 11 is not disposed.

Figure 9:
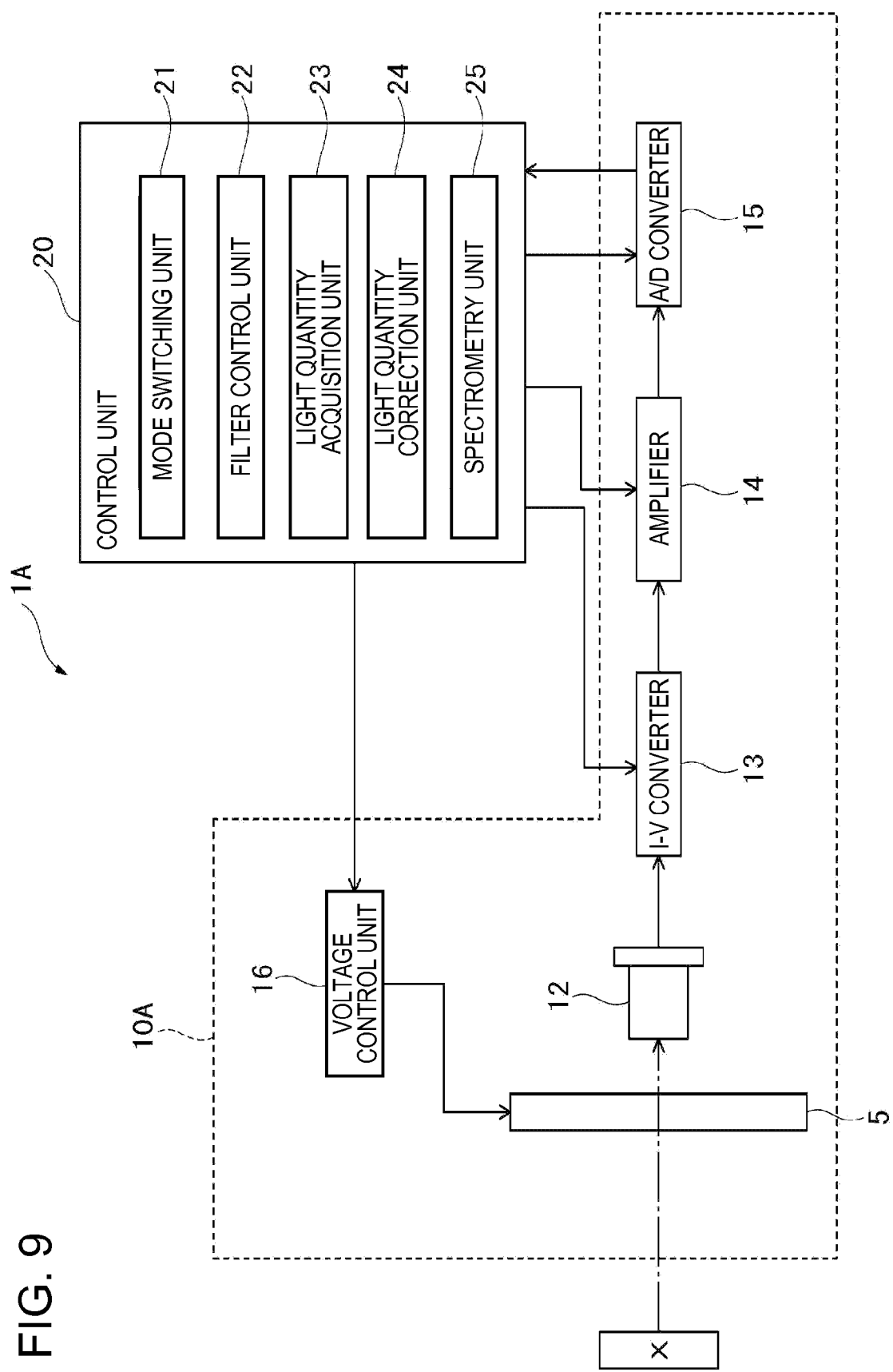
FIG. 9 is a block diagram illustrating a schematic configuration of a spectrometry device of a second embodiment according to the invention.

FIG. 9 illustrates a schematic configuration of a spectrometry device 1A of the present embodiment. In the following description, the same reference numerals are given to configuring elements which are the same as those of the first embodiment, and a description thereof will be omitted or simplified.

As illustrated in FIG. 9, in the spectrometry device 1A of the embodiment, an optical module 10A is not provided with the cutoff filter 11. Incident light from the measurement target X is transmitted through the wavelength-tunable interference filter 5, and is incident on the detector 12 as it is.

In addition, in the embodiment, the measurement target wavelength is within an infrared region (near-infrared region).

As the detector 12 of the embodiment, those are used which have low light receiving sensitivity with respect to the wavelength region (for example, the visible light region or the ultraviolet region) which is smaller than that of the measurement target wavelength, and in which the sensitivity with respect to the light transmitted through the wavelength-tunable interference filter 5 in the stray light inspection mode is within a predetermined sensitivity threshold value (for example, 100 mA/W) or less. In other words, in the embodiment, the first dimension in the stray light inspection mode is set to be a dimension in which the light receiving sensitivity of the detector 12 with respect to the light transmitted through the wavelength-tunable interference filter 5 is within a sensitivity threshold value or less. The sensitivity threshold value may be appropriately set depending on an acceptable range of measurement error.

For example, when the measurement target wavelength is within the infrared region (near-infrared region), as illustrated in FIG. 3, it is possible to use InGaAs photodiodes (light-receivable wavelength region: 800 nm to 2,600 nm) or Ge photodiodes (light-receivable wavelength region: 400 nm to 1,700 nm). Therefore, the first dimension is set so that the light having the wavelength which is smaller than that of the sensitivity region of the detector 12 is transmitted through the wavelength-tunable interference filter 5. More specifically, the height dimension (thickness dimension) of the first pillar 571 and the second pillar 572 is set so that the dimension of the gap G1 is the first dimension when the first pillar 571 and the second pillar 572 are in contact with each other.

Even in the embodiment, it is possible to acquire the correction light quantity for each target wavelength by performing the spectrometry process similar to the above-described first embodiment.

Figure 10:
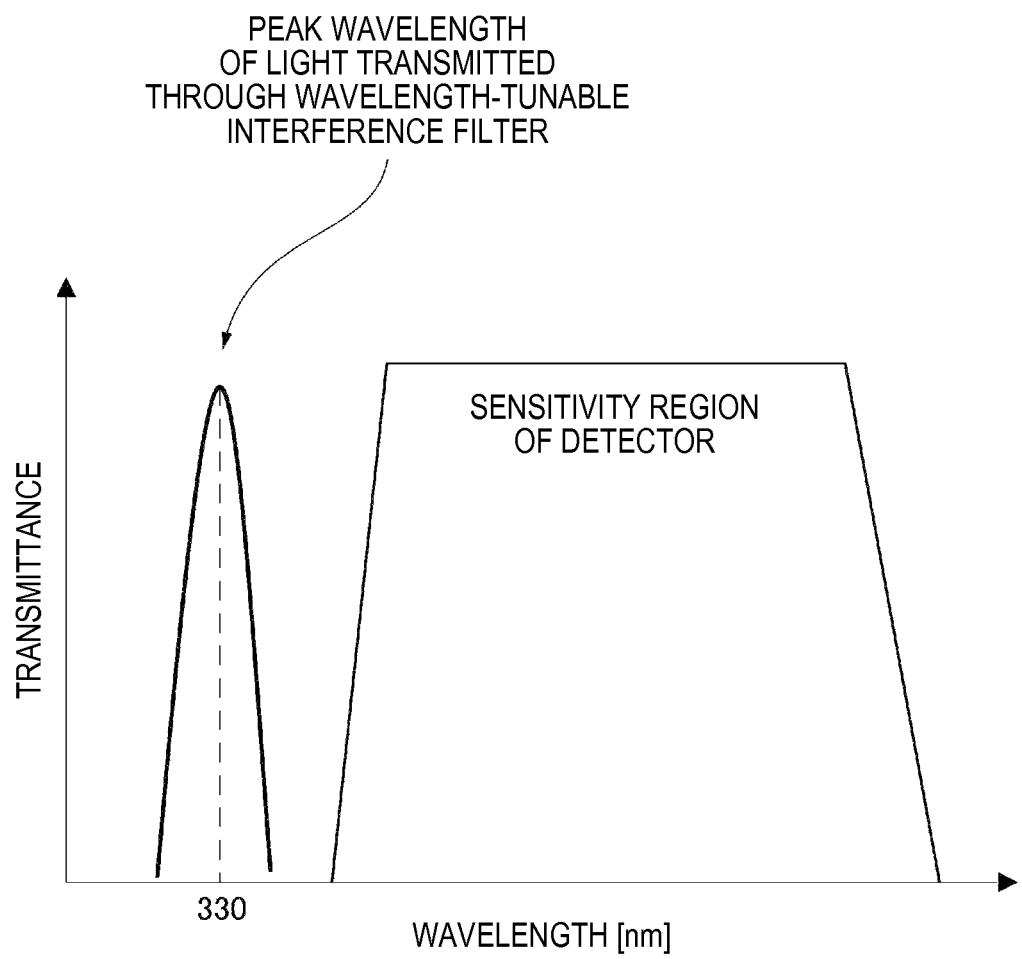
FIG. 10 illustrates a peak wavelength of light transmitted through a wavelength-tunable interference filter in a stray light inspection mode, and a sensitivity region of a detector in the spectrometry device of the second embodiment.

FIG. 10 illustrates a peak wavelength of the light transmitted through the wavelength-tunable interference filter 5 in the stray light inspection mode, and a sensitivity region in the detector 12.

If the gap G1 between the reflection films 54 and 55 is set to be the first dimension in the stray light inspection mode from step S1 to step S3, the light having the wavelength corresponding to the first dimension (for example, the light having the wavelength of 330 nm, when the first dimension is 50 nm) is transmitted through the wavelength-tunable interference filter 5. However, as illustrated in FIG. 10, in the detector 12, the light receiving sensitivity is low with respect to the light having the wavelength corresponding to the first dimension. Even though the detector 12 receives the light, the signal output from the detector 12 has a sufficiently small value to be negligible as compared to a signal value for the stray light quantity. Therefore, similar to the above-described first embodiment, it is also possible to accurately acquire the stray light quantity in the embodiment.

Thereafter, similar to the first embodiment, the processes from step S4 to step S9 are performed.

Advantageous Effects of Second Embodiment

In the embodiment, the dimension of gap G1 between the reflection films 54 and 55 in the wavelength-tunable interference filter 5 in the stray light inspection mode is set to be the first dimension corresponding to the wavelength in which the light receiving sensitivity of the detector 12 is within a predetermined sensitivity threshold value or less.

In this manner, even when light is transmitted through the wavelength-tunable interference filter 5 in the stray light inspection mode, the light quantity of the light is not detected by the detector 12, or the detected light quantity has a sufficiently small value compared to the stray light quantity. Accordingly, it is possible to accurately detect the stray light quantity. In this manner, similar to the above-described first embodiment, it is possible to acquire the exact stray light quantity. Therefore, it is possible to accurately calculate the correction light quantity based on the measurement light quantity and the stray light quantity by using the light quantity correction unit 24.

In addition, in the embodiment, since the cutoff filter 11 is not disposed, to that extent, it is possible to simplify the configuration of the optical module 10A and the spectrometry device 1A.

Another Embodiment

The invention is not limited to the above-described embodiments, and modifications or improvements within the range enabling the object of the invention to be achieved are intended to be included in the scope of the invention.

For example, in the above-described embodiments, an example has been described where the gap between the drive electrodes 561 and 562 is larger than the gap G1 between the reflection films 54 and 55, but is not limited thereto. For example, the gap G1 may be configured to be larger than the gap between the drive electrodes 561 and 562 depending on the wavelength region of the measurement target light, such as a case where infrared rays or far-infrared rays are used as the measurement target light. In this case, a configuration is adapted so that the first pillar 571 is disposed on the electrode installation surface 511A and the second pillar 572 is disposed at a position opposed to the first pillar 571. Then, the height dimension of the first pillar 571 and the second pillar 572 may be set so that the gap dimension between the reflection films 54 and 55 is the first dimension when the first pillar 571 and the second pillar 572 are in contact with each other.

An example has been described where the gap G1 is the first dimension in such a manner that the first pillar 571 is disposed in the stationary substrate 51, the second pillar 572 is disposed in the movable substrate 52 and the first pillar 571 and the second pillar 572 are in contact with each other, but is not limited thereto. For example, the gap G1 may be configured to be the first dimension in such a manner that the first pillar 571 disposed in the stationary substrate 51 is in contact with the movable substrate 52. Similarly, the gap G1 may be configured to be the first dimension in such a manner that the second pillar 572 disposed in the movable substrate 52 is in contact with the stationary substrate 51. In addition, the second pillar 572 may be configured to be in contact with a region other than the first pillar 571 of the stationary substrate 51 in such a manner that the first pillar 571 is disposed in the stationary substrate 51, the second pillar 572 is disposed in the movable substrate 52 and the first pillar 571 of the stationary substrate 51 is in contact with a region other than the second pillar 572 of the movable substrate 52.

In the above-described embodiments, an example has been described where after acquiring the stray light quantity through the stray light inspection mode from step S1 to step S3, the measurement mode from step S4 to step S7 is performed so as to acquire the measurement light quantity of the target wavelength, but there is no limitation thereto.

The stray light quantity may be acquired through the stray light inspection mode after acquiring the measurement light quantity of each target wavelength through the measurement mode.

In addition, in the measurement mode, each time the target wavelength is switched over (each time it is determined "No" in step S7), the process may return to step S1 to perform an acquisition process of the stray light quantity.

Furthermore, an example has been described where each time the measurement light quantity is measured for each target wavelength through a single measurement mode (step S4 to step S7), the stray light quantity is acquired in the stray light inspection mode, but there is no limitation thereto. For example, when there is no change in an installation environment of the spectrometry devices 1 and 1A, the process for acquiring the stray light quantity may be performed in the stray light inspection mode each time the measurement mode is performed multiple times. In addition, the process for acquiring the stray light quantity may be performed through the stray light inspection mode based on an operation of a measuring person.

In the above-described embodiments, the measurement target wavelength region is set to be the visible light region, but is not limited thereto. The measurement target wavelength region may be set to be the infrared region (including the near-infrared region). In this case, the cutoff filter 11 similar to the above-described first embodiment may be used, or the cutoff filter 11 which can cut off the smaller wavelength region (visible light region may be included) with respect to the infrared region may be used.

In the second embodiment, similar to the first embodiment, an example has been described where the first dimension is 50 nm, but is not limited thereto. When the measurement wavelength region is the infrared region or the near-infrared region, as illustrated in FIG. 3, the Ge photodiodes have the light receiving sensitivity in the range of 400 nm to 1,700 nm. Therefore, the first dimension may be set so that the light having the wavelength of less than 400 nm is transmitted through the wavelength-tunable interference filter 5 in the stray light inspection mode. Similarly, since the InGaAs photodiodes have the light receiving sensitivity in the range of 800 nm to 2,600 nm, the first dimension may be set so that the light having the wavelength of less than 800 nm is transmitted through the wavelength-tunable interference filter 5 in the stray light inspection mode.

In addition, in this case, if the gap G1 can be set to be the first dimension by using the electrostatic actuator 56 without the reflection films 54 and 55 being in contact with each other, a configuration may be adapted without disposing the first pillar 571 and the second pillar 572.

In addition, in the stray light inspection mode, it is sufficient unless the light transmitted through the wavelength-tunable interference filter 5 is detected by the detector 12. Accordingly, the wavelength of the transmitted light may have some variations. For example, in the first embodiment, the gap G1 is set to be the first dimension in the stray light inspection mode. However, even when the gap G1 is slightly larger than the first dimension, it is advantageous if the wavelength of the light which can be transmitted through the wavelength-tunable interference filter 5 is a wavelength region which is cut off by the cutoff filter 11. In addition, even in the second embodiment, it is advantageous if the light transmitted through the wavelength-tunable interference filter 5 is light having the wavelength outside the light receiving sensitivity region of the detector 12.

In the first and second embodiments, an example has been described where the first wavelength is set to be a smaller wavelength than that of the measurement wavelength region and the dimension of the gap G1 is set to be the first dimension corresponding to the first wavelength, but there is no limitation thereto.

Figure 11:
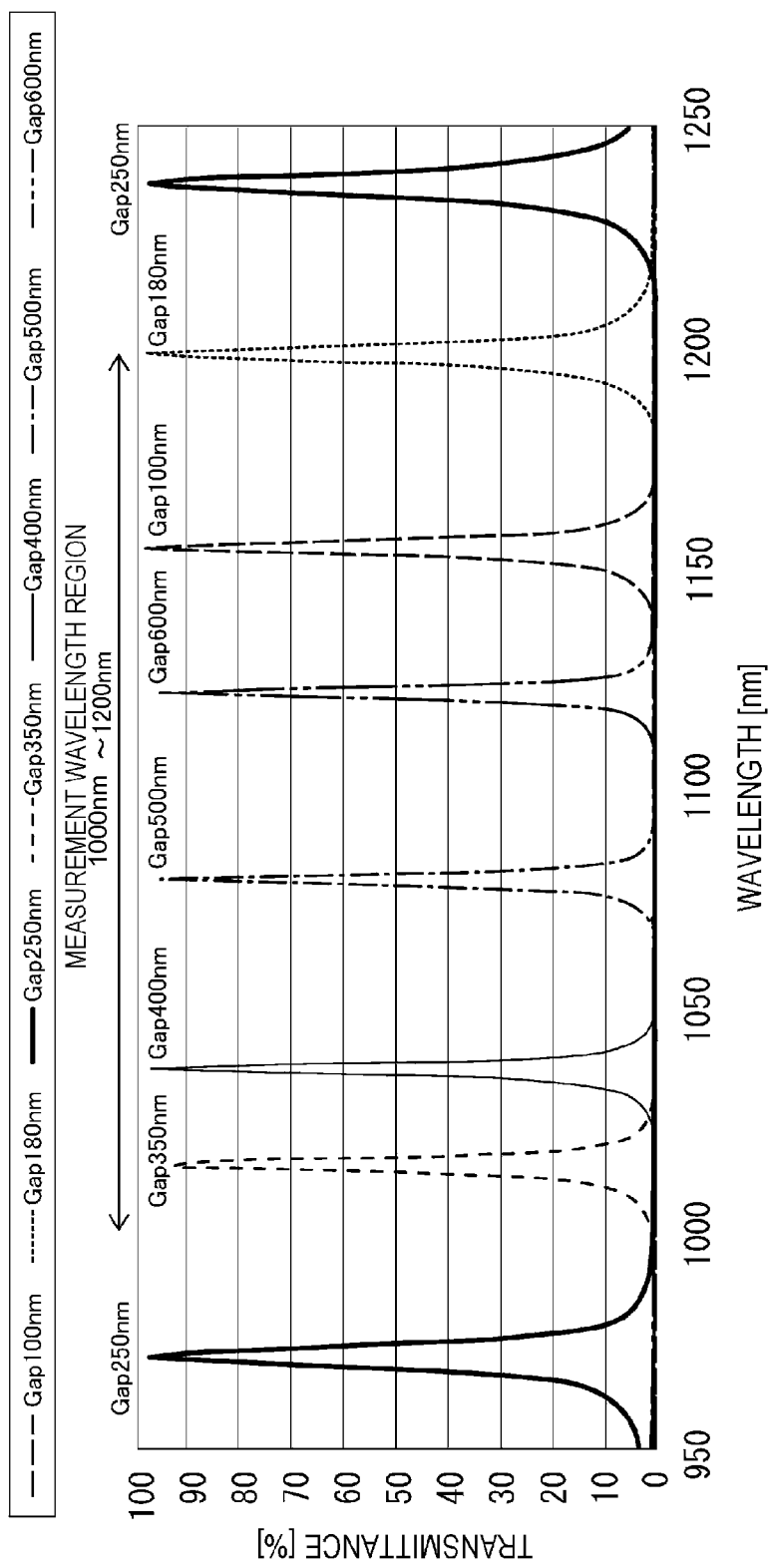
FIG. 11 illustrates a transmission peak wavelength with respect to a dimension of a gap between reflection films when using a dielectric multilayer film as the reflection film in another embodiment of the invention.

For example, a wavelength which is larger than that of the measurement wavelength region may be set to be the first wavelength. FIG. 11 illustrates a peak wavelength of the light transmitted through the wavelength-tunable interference filter 5 with respect to the gap dimension of the gap G1, when a dielectric multilayer film is used as the reflection films 54 and 55.

In this example, when the measurement wavelength region is set to be 1,000 nm to 1,200 nm, the cutoff filter 11 is used which sets the first wavelength to be approximately 1,240 nm and blocks the light having a wavelength of less than 1,000 nm and the light having a wavelength which is larger than 1,200 nm. In this case, if the dimension of the gap G1 is set to be 250 nm as illustrated in FIG. 11, the light of approximately 1,237 nm which is a first peak wavelength and the light of approximately 970 nm which is a second peak wavelength are transmitted through the wavelength-tunable interference filter 5. However, since the light is blocked by the cutoff filter 11, the light is not received by the detector 12. Therefore, by setting the dimension of the gap G1 to be 250 nm in the stray light inspection mode, it is possible to detect only the light quantity of the stray light.

On the other hand, in the measurement mode, as illustrated in FIG. 11, by switching the dimension of the gap G1 from 600 nm to 350 nm for example, it is possible to allow the light from 1,000 nm to 1,125 nm to be sequentially transmitted as the light having the second peak wavelength. At this time, since the light having a wavelength other than the second peak wavelength is blocked by the cutoff filter 11, the light is not received by the detector 12. Furthermore, by sequentially switching the dimension of the gap G1 in the range of less than 180 nm (for example, 180 nm to 100 nm), it is possible to allow the light from 1,125 nm to 1,200 nm to be sequentially transmitted as the first peak wavelength. At this time since the light having a wavelength other than the first peak wavelength is blocked by the cutoff filter 11, the light is not received by the detector 12.

The above description is made as an example of using the cutoff filter 11. However, as in the second embodiment, the detector 12 may be used where the light receiving sensitivity is within the sensitivity threshold value or less with respect to the light having the wavelength of less than 1,000 nm and the light having the wavelength which is larger than 1,200 nm.

In the above-described respective embodiments, a configuration has been described as an example where the movable reflection film 55 is disposed in the movable substrate 52 which is the second substrate, but is not limited thereto. For example, a configuration may be adapted so that a movable reflection film which is the second reflection film is disposed to close a groove (electrode arrangement groove 511, reflection film installation portion 512 or the like) of the stationary substrate 51, and the second drive electrode 562 is disposed on the movable reflection film via an insulating layer. In addition, in this case, the second pillar 572 is disposed on the movable reflection film.

Furthermore, without disposing the stationary substrate 51 which is the first substrate or the movable substrate 52 which is the second substrate, the first reflection film and the second reflection film may be configured to be opposed to each other. In this case, for example, the first drive electrode and the first pillar are formed on one surface of a parallel plate-shaped sacrificial layer, and the first reflection film is formed to cover these. In addition, the second drive electrode and the second pillar are formed on the other surface of the sacrificial layer, and the second reflection film is formed to cover these. Thereafter, the sacrificial layer is removed. In this manner, the first reflection film having the first drive electrode and a first control electrode and the second reflection film having the second drive electrode and a second control electrode can form a Fabry-Perot etalon in which the first reflection film and the second reflection film are opposed to each other leaving a space therebetween. In this configuration, the first substrate and the second substrate are not disposed. Accordingly, a spectral element can be thinner in size. In addition, in this case, it is possible to maintain the gap dimension between the reflection films by interposing a spacer or the like for example, between the first reflection film and the second reflection film.

In addition, in the above-described respective embodiments, the electrostatic actuator 56 has been described as an example of the gap change unit, and a configuration where the electrostatic actuator 56 changes the dimension of the gap G1 between the stationary reflection film 54 and the movable reflection film 55 has been described as an example. However, the examples are not limited thereto.

For example, as the gap change unit, a configuration may be adapted which employs a an induction actuator configured to have a first induction coil to be disposed in the stationary substrate 51 and a second induction coil to be disposed in the movable substrate 52, or a permanent magnet.

Further, instead of the electrostatic actuator 56, a configuration may be adapted so as to employ a piezoelectric actuator. In this case, for example, a lower electrode layer, a piezoelectric film and an upper electrode layer are arranged and stacked one on another on the holding portion 522, and a voltage applied across the lower electrode layer and the upper electrode layer is varied as an input value. In this manner, it is possible to deflect the holding portion 522 by expanding and contracting the piezoelectric film.

Furthermore, without being limited to a configuration in which the size of the gap G1 between the reflection films 54 and 55 is changed by applying the voltage, for example, a configuration in which the size of the gap G1 is adjusted by changing an air pressure between the stationary substrate 51 and the movable substrate 52 can be adapted as an example.

In addition, in the above-described respective embodiments, a configuration is adapted so that the wavelength-tunable interference filter 5 is directly disposed in the optical modules 10 and 10A. However, the optical module has a complicated configuration, and in some cases, it is difficult to directly dispose the wavelength-tunable interference filter 5 particularly in a small size optical module. In contrast, a configuration may be adapted so that the wavelength-tunable interference filter 5 is accommodated inside a housing to install in the optical module or the like.

Figure 12:
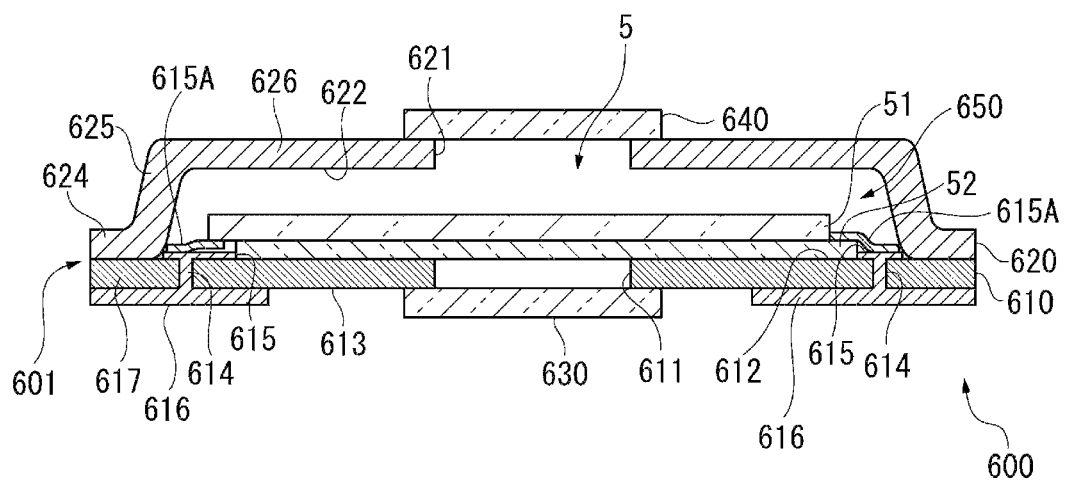
FIG. 12 is a cross-sectional view illustrating a schematic configuration of an optical filter device which accommodates a wavelength-tunable interference filter.

FIG. 12 is a cross-sectional view illustrating a schematic configuration of an optical filter device according to another embodiment of the invention.

As illustrated in FIG. 12, an optical filter device 600 includes the wavelength-tunable interference filter 5 and a housing 601 which accommodates the wavelength-tunable interference filter 5.

The housing 601 includes a base substrate 610, a lid 620, a base side glass substrate 630 and a lid side glass substrate 640.

The base substrate 610 is configured to have a single layer ceramic substrate, for example. The movable substrate 52 of the wavelength-tunable interference filter 5 is installed in the base substrate 610. The movable substrate 52 may be installed in the base substrate 610 via a bonding layer or by being fitted to other fixing members. In addition, in the base substrate 610, a light transmitting hole 611 is formed to open in a region opposed to an optical interference region (region where the reflection films 54 and 55 are opposed to each other). Then, the base side glass substrate 630 is bonded so as to cover the light transmitting hole 611. A bonding method of the base side glass substrate 630, for example, can employ glass frit bonding using a glass frit which is formed of chips of glass obtained by melting glass materials at a high temperature and through quick chilling of the melted glass, epoxy resin bonding, or the like.

A base inner surface 612 opposed to the lid 620 of the base substrate 610 has an inner terminal 615 corresponding to each extracting electrode connected to drive electrodes 561 and 562 of the wavelength-tunable interference filter 5. For connection between each extracting electrode and the inner terminal 615, an FPC 615A can be used, for example. The connection is made through bonding by using Ag paste, an anisotropic conductive film (ACF), anisotropic conductive paste (ACP), or the like, for example. When maintaining an inner space 650 to be in a vacuum state, it is preferable to use the Ag paste having less outgassing. In addition, without being limited to the connection by using the FPC 615A, wire connection may be performed by using wire bonding, for example.

In addition, a through-hole 614 is formed in the base substrate 610 so as to correspond to a position of each inner terminal 615. Each inner terminal 615 is connected to an outer terminal 616 disposed on a base outer surface 613 of an opposite side to the base inner surface 612 of the base substrate 610 via a conductive member which fills the through-holes 614.

Then, a base bonding portion 617 bonded to the lid 620 is disposed in an outer peripheral surface of the base substrate 610.

As illustrated in FIG. 12, the lid 620 includes a lid bonding portion 624 bonded to a base bonding portion 617 of the base substrate 610, a sidewall portion 625 extended from the lid bonding portion 624 and erected in a direction away from the base substrate 610, and a top surface portion 626 extended from the sidewall portion 625 and covering the stationary substrate 51 side of the wavelength-tunable interference filter 5. For example, it is possible to form the lid 620 by using an alloy such as Kovar or metal.

The lid 620 is in close contact with and bonded to the base substrate 610 by the lid bonding portion 624 being bonded to the base bonding portion 617 of the base substrate 610.

For example, in addition to laser welding, the bonding method includes soldering by using silver solder, sealing with a eutectic alloy layer, welding by using low-melting glass, glass adhesion, glass frit bonding, bonding by using epoxy resin and the like. The bonding method can be appropriately selected depending on materials or bonding environments of the base substrate 610 and the lid 620.

The top surface portion 626 of the lid 620 is parallel to the base substrate 610. In the top surface portion 626, a light transmitting hole 621 is formed to open in a region opposed to an optical interference region of the wavelength-tunable interference filter 5. Then, the lid side glass substrate 640 is bonded so as to cover the light transmitting hole 621. As the bonding method of the lid side glass substrate 640, similar to the bonding of the base side glass substrate 630, it is possible to use the glass frit bonding, the bonding by using the epoxy resin or the like, for example.

In this optical filter device 600, the wavelength-tunable interference filter 5 is protected by the housing 601. Accordingly, it is possible to prevent a change in characteristics of the wavelength-tunable interference filter 5 which is caused by gas contained in foreign substances or in the air. In addition, it is possible to prevent damage to the wavelength-tunable interference filter 5 which is caused by external factors. In addition, since it is possible to prevent charged particles from entering, it is possible to prevent each of the electrodes 561 and 562 from being charged. Therefore, it is possible to suppress the Coulomb's force from being generated due to the charging, and it is possible to more reliably maintain parallelism between the reflection films 54 and 55.

In addition, for example, when transporting the wavelength-tunable interference filter 5 manufactured at a factory to an assembly line for assembling the optical module or the measurement device, it is possible to safely transport the wavelength-tunable interference filter 5 protected by the optical filter device 600.

In addition, the optical filter device 600 has the outer terminal 616 which is exposed from the outer peripheral surface of the housing 601. Accordingly, it is possible to easily perform wiring even when assembling the optical filter device 600 with the optical module or the measurement device.

In addition, in the above-described respective embodiments, the spectrometry devices 1 and 1A have been described as examples of the measurement device according to the invention. However, in addition to this, it is possible to apply the measurement device to various fields.

Figure 13:
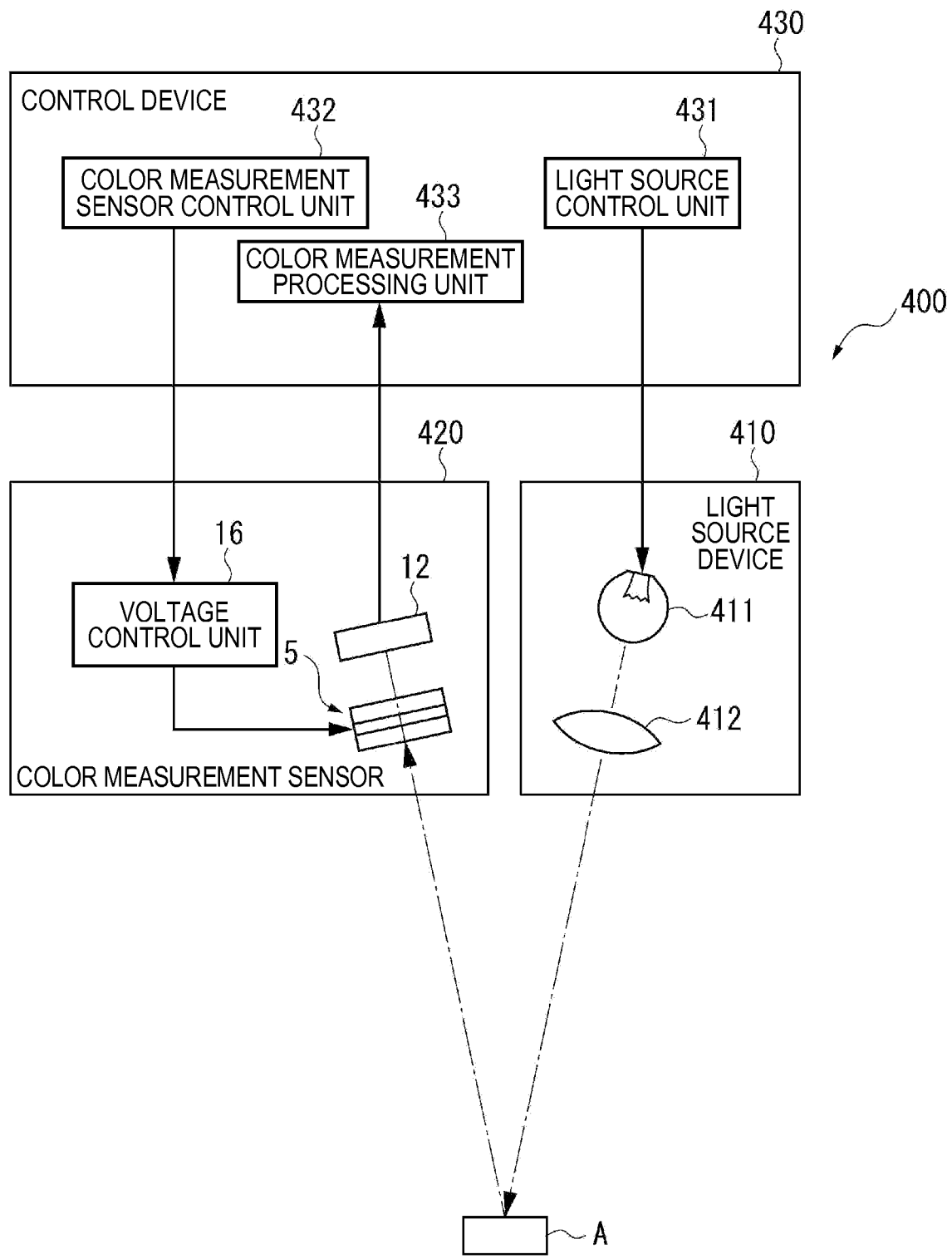
FIG. 13 is a block diagram illustrating a schematic configuration of a color measurement device which is an example of a measurement device.

For example, as illustrated in FIG. 13, it is possible to apply the measurement device to a color measurement device for measuring colors.

FIG. 13 is a block diagram illustrating an example of a color measurement device 400 provided with the wavelength-tunable interference filter 5.

As illustrated in FIG. 13, the color measurement device 400 includes a light source device 410 which emits light to an inspection target A, a color measurement sensor 420, and a control device 430 which controls overall operations of the color measurement device 400. The color measurement device 400 causes the light emitted from the light source device 410 to be reflected on the inspection target A, and receives reflected inspection target light by using the color measurement sensor 420. Based on a detection signal output from the color measurement sensor 420, the color measurement device 400 analyzes and measures chromaticity of the inspection target light, that is, colors of the inspection target A.

The light source device 410 includes a light source 411 and a plurality of lenses 412 (only one is illustrated in FIG. 13)

and emits reference light (for example, white light), for example, to the inspection target A. In addition, the plurality of lenses 412 may include a collimator lens. In this case, the light source device 410 converts the reference light emitted from the light source 411 into parallel light by using the collimator lens, and emits the light toward the inspection target A through a projection lens (not illustrated). In the embodiment, the color measurement device 400 including the light source device 410 has been described as an example. However, for example, when the inspection target A is a light emitting member such as a liquid crystal panel, a configuration without disposing the light source device 410 may be adapted.

As illustrated in FIG. 13, the color measurement sensor 420 includes the wavelength-tunable interference filter 5, the detector 12 which receives the light transmitted through the wavelength-tunable interference filter 5, and the voltage control unit 16 which can change the wavelength of the light transmitted through the wavelength-tunable interference filter 5. In addition, the color measurement sensor 420 includes an incident light optical lens (not illustrated) which is located at a position opposed to the wavelength-tunable interference filter 5 and internally introduces the light reflected on the inspection target A (inspection target light). Then, the color measurement sensor 420 spectrally splits the light having a predetermined wavelength from the inspection target light emitted from the incident light optical lens by the wavelength-tunable interference filter 5, and receives the spectrally split light by using the detector 12.

The control device 430 controls overall operations of the color measurement device 400.

As the control device 430, for example, it is possible to use a general-purpose personal computer, a portable information terminal or color measurement-dedicated computer. Then, as illustrated in FIG. 13, the control device 430 is configured to include a light source control unit 431, a color measurement sensor control unit 432 and a color measurement processing unit 433.

The light source control unit 431 is connected to the light source device 410. For example, based on setting input of a user, the light source control unit 431 outputs a predetermined control signal to the light source device 410 such that white light having predetermined brightness is emitted.

The color measurement sensor control unit 432 functions as the mode switching unit 21, the filter control unit 22, the light quantity acquisition unit 23 and the light quantity correction unit 24 in the above-described embodiments.

The color measurement processing unit 433 analyzes the chromaticity of the inspection target A using the correction light quantity which is detected by the detector 12 and calculated by the color measurement sensor control unit 432.

In addition, another example of the measurement device according to the invention can include an optical-based system for detecting presence of specific substances. For example, this system can include an in-vehicle gas leakage detector which employs a spectrometry method using the optical module according to an embodiment the invention and highly sensitively detects a specific gas, or a gas detection device such as a photoacoustic rare gas detector for a breath test.

An example of this gas detection device will be described with reference to the following drawings.

Figure 14:
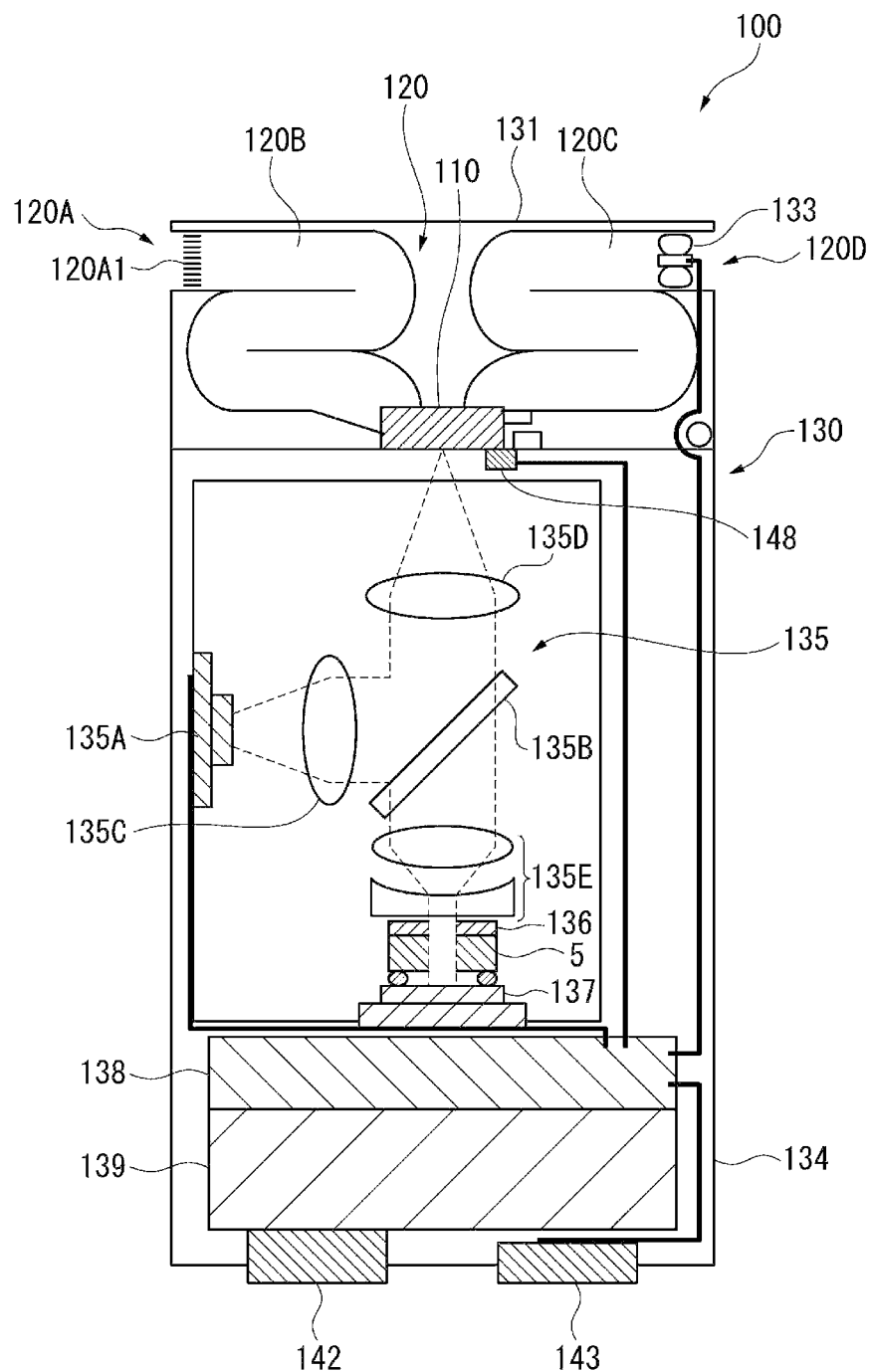
FIG. 14 is a schematic view of a gas detection device which is an example of the measurement device.

FIG. 14 is a schematic view of the gas detection device provided with the optical module according to an embodiment the invention.

Figure 15:
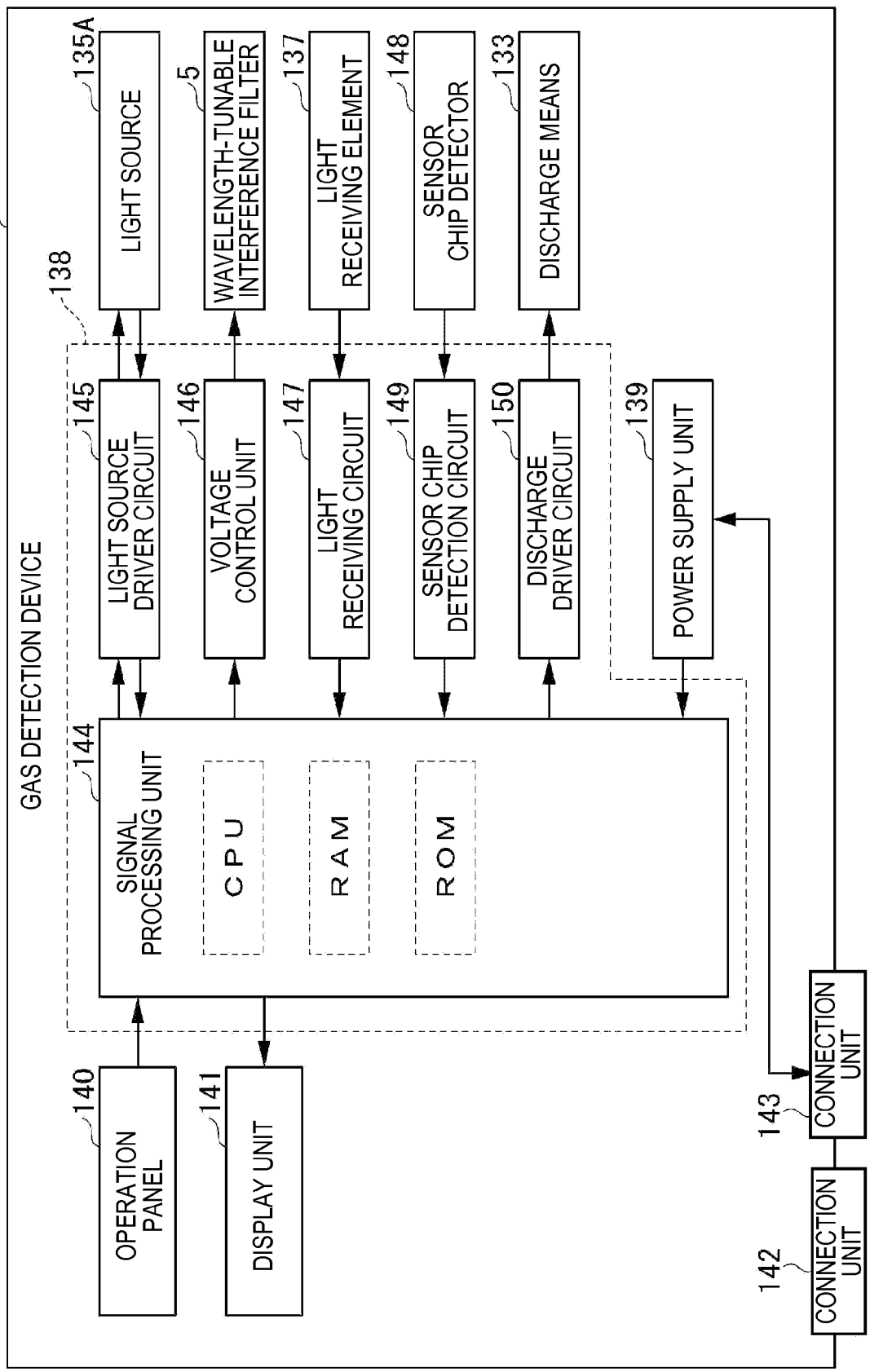
FIG. 15 is a block diagram illustrating a configuration of a control system of the gas detection device in FIG. 14.

FIG. 15 is a block diagram illustrating a configuration of a control system of the gas detection device in FIG. 14.

As illustrated in FIG. 14, the gas detection device 100 is configured to include a sensor chip 110, a flow path 120 having a suction port 120A, a suction flow path 120B, a discharge flow path 120C and a discharge port 120D, and a main body 130.

The main body 130 is configured to have a detection device (optical module) including a sensor portion cover 131 having an opening which enables the flow path 120 to be attached thereto and detached therefrom, a discharge unit 133, a housing 134, an optical unit 135, a filter 136, a wavelength-tunable interference filter 5 and a light receiving element 137 (detection unit); a control unit 138 (processing unit) which processes the detected signal and controls the detection unit; and a power supply unit 139 which supplies power. In addition, the optical unit 135 is configured to have a light source 135A which emits light; a beam splitter 135B which reflects the light incident from the light source 135A to the sensor chip 110 side and transmits the light incident from the sensor chip 110 side to the light receiving element 137 side; and lenses 135C, 135D and 135E.

In addition, as illustrated in FIG. 15, an operation panel 140, a display unit 141, a connection unit 142 for external interface, and a power supply unit 139 are disposed on a surface of the gas detection device 100. If the power supply unit 139 is a secondary battery, a connection unit 143 for charging may be provided.

Furthermore, as illustrated in FIG. 15, the control unit 138 of the gas detection device 100 includes a signal processing unit 144 configured to have a CPU or the like; a light source driver circuit 145 for controlling the light source 135A; a voltage control unit 146 for controlling the wavelength-tunable interference filter 5; a light receiving circuit 147 which receives a signal from the light receiving element 137; a sensor chip detection circuit 149 that receives a signal from a sensor chip detector 148 which reads out codes of the sensor chip 110 and detects presence or absence of the sensor chip 110; and a discharge driver circuit 150 which controls the discharge unit 133.

Next, an operation of the above-described gas detection device 100 will be described in the following.

A sensor chip detector 148 is disposed inside the sensor portion cover 131 in an upper portion of the main body 130, and the sensor chip detector 148 detects the presence or absence of the sensor chip 110. The signal processing unit 144, when detecting a detection signal from the sensor chip detector 148, determines that the sensor chip 110 is in a mounted state, and outputs a display signal to the display unit 141 so as to display that a detection operation can be performed.

Then, for example, if a user operates the operation panel 140 and a command signal to start a detection process is output from the operation panel 140 to the signal processing unit 144, the signal processing unit 144 first outputs a signal for a light source operation to the light source driver circuit 145 and operates the light source 135A. If the light source 135A is driven, a linearly polarized and stable laser beam having a single wavelength is emitted from the light source 135A. In addition, the light source 135A internally has a temperature sensor or a light quantity sensor, and information thereof is output to the signal processing unit 144. Then, when determining that the light source 135A is stably operated based on the temperature and the light quantity which are input from the light source 135A, the signal processing unit 144 controls the discharge driver circuit 150 such that the discharge unit 133 is operated. In this manner, a gas sample containing detecting target substances (gas molecules) is induced from the suction port 120A to the discharge port 120D via the suction flow path 120B, the inside of the sensor chip 110 and the discharge flow path 120C. The suction port 120A has a dust removal filter 120A1 which removes relatively large dust or a portion of water vapor.

In addition, the sensor chip 110 is a sensor in which a plurality of metallic nanostructures is incorporated to use localized surface plasmon resonance. This sensor chip 110 has an enhanced electric field which is formed between the metallic nanostructures by a laser beam. If the gas molecules enter the enhanced electric field, Raman scattering light including information of molecular vibrations and Rayleigh scattering light are generated.

The Rayleigh scattering light and the Raman scattering light are incident on the filter 136 through the optical unit 135, the Rayleigh scattering light is split by the filter 136 and the Raman scattering light is incident on the wavelength-tunable interference filter 5. Then, the signal processing unit 144 functions as the mode switching unit 21, the filter control unit 22, the light quantity acquisition unit 23 and the light quantity correction unit 24 in the above-described embodiments. That is, similar to the above-described embodiments, the signal processing unit 144 drives the electrostatic actuator 56 of the wavelength-tunable interference filter 5, and calculates the stray light quantity (detection in the stray light inspection mode) input from the light receiving element 137 via the light receiving circuit 147, and the correction light quantity of the Raman scattering light from the measurement light quantity (detection in the measurement mode) of the Raman scattering light corresponding to the gas molecules which are a detection target.

The signal processing unit 144 compares spectral data of the Raman scattering light corresponding to the gas molecules which are the detection target obtained as above with data stored in the ROM, determines whether or not the gas molecules are target gas molecules, and specifies the substances. In addition, the signal processing unit 144 displays result information thereof on the display unit 141, or outputs the information to outside from the connection unit 142.

In FIGS. 14 and 15, the gas detection device 100 has been described as an example where the Raman scattering light is split by the wavelength-tunable interference filter 5 and the gas detection is performed by using the split Raman scattering light. However, a gas detection device may be used which specifies types of gas by detecting gaseous inherent absorbance. In this case, a gas sensor which allows the gas to flow into the sensor and detects the light absorbed in the gas within the incident light is used as the optical module. Then, the invention focuses on the gas detection device that analyzes and determines the gas which is allowed to flow in the sensor by using this gas sensor. Even in this configuration, it is possible to detect the gas components by using the wavelength-tunable interference filter.

In addition, without being limited to the gas detection as described above, the system for detecting the presence of the specific substances can include a material component analyzer such as a noninvasive measurement device for sugars by using near-infrared light spectroscopy, and a noninvasive measurement device for information of foodstuffs, living bodies and minerals.

Hereinafter, a food analyzer will be described as an example of the above-described material component analyzer.

Figure 16:
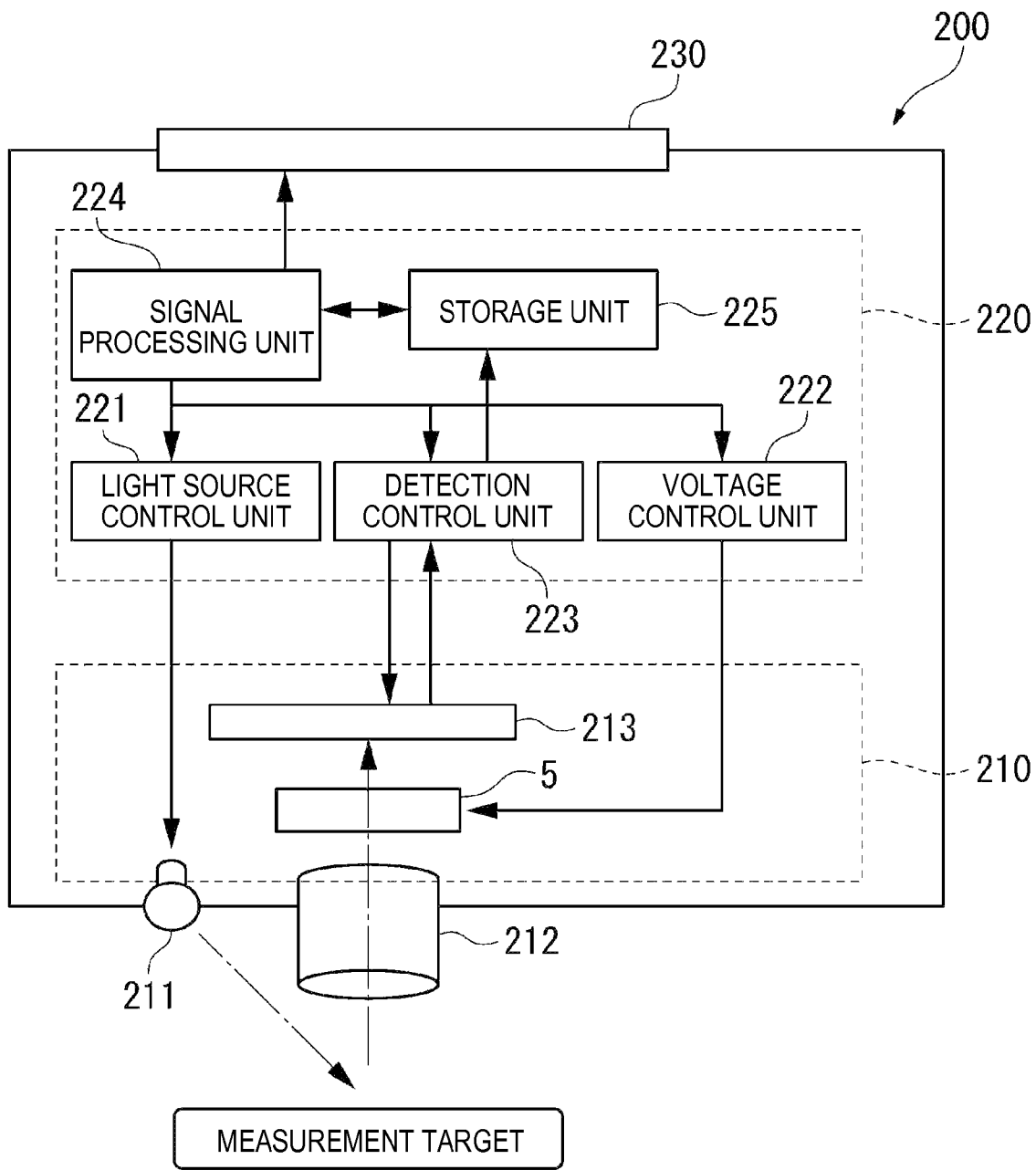
FIG. 16 illustrates a schematic configuration of a food analyzer which is an example of the measurement device.

FIG. 16 illustrates a schematic configuration of the food analyzer which is an example of the measurement device employing the optical module according to an embodiment of the invention.

As illustrated in FIG. 16, a food analyzer 200 includes a detector 210 (optical module), a control unit 220 and a display unit 230. The detector 210 includes a light source 211 which emits light, an imaging lens 212 to which the light is introduced from a measurement target, a wavelength-tunable interference filter 5 which splits the light introduced from the imaging lens 212, and an imaging unit 213 (detection unit) which detects the split light.

The control unit 220 includes a light source control unit 221 which performs switching on-off controls on the light source 211 and performs a brightness control during the switching-on, a voltage control unit 16 which controls the wavelength-tunable interference filter 5, a detection control unit 223 which controls the imaging unit 213 and acquires a spectral image captured by the imaging unit 213, a signal processing unit 224 and a storage unit 225. The signal processing unit 224 functions as the mode switching unit 21, the filter control unit 222, the light quantity acquisition unit 23 and the light quantity correction unit 24 in the above-described embodiments.

In the food analyzer 200, if a system is driven, the light source 211 is controlled by the light source control unit 221 such that light is emitted to the measurement target through the light source 211. Then, the light reflected on the measurement target is incident on the wavelength-tunable interference filter 5 through the imaging lens 212. The wavelength-tunable interference filter 5 is driven by the control of the voltage control unit 222 in the drive method as described in the first embodiment. In this manner, it is possible to acquire a highly accurate correction light quantity (spectral image) excluding the stray light quantity. The acquired spectral image is stored in the storage unit 225.

Then, the signal processing unit 224 performs arithmetic processing on each pixel data item in each image stored in the storage unit 225, and obtains a spectrum in each pixel. In addition, the storage unit 225 stores information relating to food components with respect to the spectrum, for example. The signal processing unit 224 analyzes the data of the obtained spectrum based on the information relating to the foodstuffs which is stored in the storage unit 225, and obtains food components included in the detection target and a content thereof. In addition, it is also possible to calculate food calories or freshness by using the obtained food components and contents. Further, it is possible to extract a degraded portion in freshness from the inspection target foodstuffs by analyzing spectral distribution within the image. Furthermore, it is possible to detect foreign substances or the like contained in the foodstuffs.

Then, the signal processing unit 224 performs a display process to display the information relating to components, contents, calories or freshness of the inspection target foodstuffs which are obtained as described above, on the display unit 230.

In addition, in FIG. 16, an example of the food analyzer 200 is illustrated. However, it is also possible to use substantially the same configuration in a noninvasive measurement device for other information as described above. For example, it is possible to use the measurement device as a biological analyzer which measures and analyzes body fluid components such as blood analyzing, and analyzes living body components. If the biological analyzer is used in a device for detecting ethyl alcohol as the device for measuring the body fluid components such as blood, for example, it is possible to use the measurement device as a prevention device of driving while intoxicated which detects a drinking level of a driver. In addition, it is also possible to use the measurement device as an electronic endoscope system including this biological analyzer.

Furthermore, it is also possible to use the measurement device as a mineral analyzer for analyzing components of minerals.

Furthermore, the optical module serving as the measurement device can be applied to the following devices.

For example, it is possible to transmit data using light having each wavelength by changing intensity of light having each wavelength in a time-dependent manner. In this case, the wavelength-tunable interference filter disposed in the optical module splits the light having a specific wavelength, and the light receiving unit receives the light. In this manner, it is possible to extract the data transmitted by the light having the specific wavelength. Thus, it is possible to perform an optical communication by processing the data of the light having each wavelength by using the measurement device provided with the optical module for data extraction as described above. At this time, as in the above-described respective embodiments, it is possible to improve reliability in the optical communication by excluding the stray light quantity.

In addition, the measurement device can also be applied to a spectral camera which captures a spectral image or a spectral analyzer by splitting the light using the optical module. An example of the spectral camera includes an infrared camera which internally has the wavelength-tunable interference filter.

Figure 17:
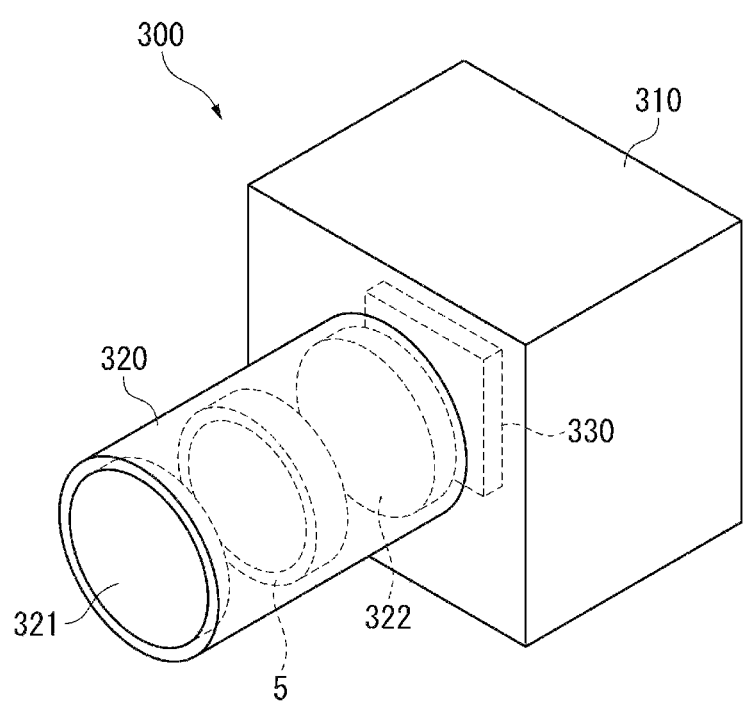
FIG. 17 is a schematic view illustrating a configuration of a spectral camera which is an example of the measurement device.

FIG. 17 is a schematic view illustrating a configuration of the spectral camera. As illustrated in FIG. 17, a spectral camera 300 includes a camera body 310, an imaging lens unit 320 and imaging unit 330.

The camera body 310 is a portion gripped and operated by a user.

The imaging lens unit 320 is disposed in the camera body 310 and introduces incident image light to the imaging unit 330. In addition, as illustrated in FIG. 17, the imaging lens unit 320 is configured to include an objective lens 321, an image formation lens 322 and the wavelength-tunable interference filter 5 disposed between the lenses.

The imaging unit 330 is configured to have the light receiving element and captures image light introduced by the imaging lens unit 320.

This spectral camera 300 can capture a spectral image of the light having a predetermined wavelength by allowing the light which is an imaging target to be transmitted through the wavelength-tunable interference filter 5. At this time, it is possible to acquire the accurate spectral image for each wavelength by detecting the stray light quantity and subtracting the stray light quantity from the measurement light quantity.

In addition, the optical module may be used as a biometric identification device, and for example, can also be applied to an identification device for blood vessels, fingerprints, retinas, irises or the like, which uses the light of the near-infrared region or the visible region.

Furthermore, the optical module and the measurement device can be used as a concentration detection device. In this case, the wavelength-tunable interference filter splits and analyzes infrared energy (infrared light) emitted from substances, thereby measuring a concentration of a test target in a sample.

As described above, the measurement device can also be applied to all devices which split predetermined light from incident light. Then, as described above, the invention enables the optical module to split a plurality of wavelengths by using a single device. Accordingly, it is possible to accurately measure a spectrum having the plurality of wavelengths and detect a plurality of components. Therefore, as compared to the device in the related art which fetches a desired wavelength using a plurality of devices, it is possible to promote miniaturization of the optical module and the measurement device. For example, the optical module and the measurement device can be preferably used as a portable or an in-vehicle optical device.

Moreover, a specific structure for actually embodying the invention can be appropriately changed to other structures within a range in which an advantage of some aspects of the invention can be realized.

The entire disclosure of Japanese Patent Application No. 2013-034259 filed on Feb. 25, 2013 is expressly incorporated by reference herein.

What is claimed is:

1. A measurement device comprising:
    a cutoff filter that blocks light in a predetermined wavelength region of incident light;
    a first reflection film that partially reflects first light transmitted through the cutoff filter and partially transmits the first light therethrough as second light;
    a second reflection film that is opposed to the first reflection film, the second reflection film partially reflecting the second light transmitted through the first reflection film and partially transmitting the second light therethrough as third light;
    a gap change unit that changes a size of a gap between the first reflection film and the second reflection film;
    a light receiving unit that receives the third light transmitted through the second reflection film; and
    a gap setting unit that controls the gap change unit and sets the size of the gap to be equal to a first dimension corresponding to a first wavelength within the predetermined wavelength region.

2. The measurement device according to claim 1, further comprising:
    a first substrate having the first reflection film mounted thereto;
    a second substrate having the second reflection film mounted thereto; and
    a gap dimension regulation unit that is disposed on at least one of the first and second substrate and that contacts the other of the first and second substrate when the size of the gap is equal to the first dimension.

3. The measurement device according to claim 2,
    wherein the gap dimension regulation unit is disposed at a position offset from where the first reflection film and the second reflection film overlap each other in a plan view.

4. The measurement device according to claim 1, further comprising:
    a light quantity acquisition unit that acquires a light quantity of the third light received by the light receiving unit when the size of the gap is equal to the first dimension;
    a measurement unit that acquires a light quantity of fourth light having a second wavelength which is received by the light receiving unit when the size of the gap is changed to correspond to the second wavelength outside of the predetermined wavelength region; and
    a light quantity correction unit that determines a corrected light quantity of the fourth light by subtracting the light quantity acquired by the light quantity acquisition unit from the light quantity acquired by the measurement unit.

5. The measurement device according to claim 4,
    wherein each time a measurement is performed by the measurement unit, the gap setting unit sets the size of the gap to be equal to the first dimension, and causes the light quantity acquisition unit to acquire the light quantity of the third light received by the light receiving unit.

6. A measurement device comprising:
a first reflection film;
a second reflection film that is opposed to the first reflection film;
a gap change unit that changes a size of a gap between the first reflection film and the second reflection film;
a light receiving unit that receives light transmitted through the second reflection film; and
a gap setting unit that controls the gap change unit and sets the size of the gap to be equal to a first dimension corresponding to a first wavelength within a predetermined wavelength region,
wherein the first wavelength is a wavelength in which a light receiving sensitivity in the light receiving unit is equal to or less than a predetermined sensitivity threshold value.

7. A measurement device comprising:
a wavelength-tunable interference filter including:
   a stationary reflection film;
   a movable reflection film facing the stationary reflection film; and
   an electrostatic actuator which changes a size of a gap between the stationary reflection film and the movable reflection film;
a filter control unit that sets the size of the gap to be equal to a first dimension corresponding to light having a first wavelength which is outside of a measurement target wavelength region;
a cutoff filter that blocks the light having the first wavelength; and
a light quantity acquisition unit that acquires a quantity of stray light received by a detector when the size of the gap is equal to the first dimension.

* * * * *